United States Patent
Howell

(10) Patent No.: US 11,605,294 B2
(45) Date of Patent: Mar. 14, 2023

(54) COMPUTER-IMPLEMENTED SYSTEMS FOR LOCATING A VEHICULAR PARKING SPACE AND CONTROLLING ACCESS THERETO

(71) Applicant: UBIPARK PTY LTD, Melbourne (AU)

(72) Inventor: Mosstyn Howell, Melbourne (AU)

(73) Assignee: UBIPARK PTY LTD, Melbourne (AU)

( * ) Notice: Subject to any disclaimer, the term of this patent is extended or adjusted under 35 U.S.C. 154(b) by 527 days.

(21) Appl. No.: 16/622,638

(22) PCT Filed: Jun. 12, 2018

(86) PCT No.: PCT/AU2018/050580
§ 371 (c)(1),
(2) Date: Dec. 13, 2019

(87) PCT Pub. No.: WO2018/227241
PCT Pub. Date: Dec. 20, 2018

(65) Prior Publication Data
US 2020/0402402 A1    Dec. 24, 2020

(30) Foreign Application Priority Data
Jun. 15, 2017  (AU) ................................ 2017902270

(51) Int. Cl.
*H04W 4/029* (2018.01)
*G08G 1/14* (2006.01)
(Continued)

(52) U.S. Cl.
CPC ............ *G08G 1/144* (2013.01); *G06F 3/167* (2013.01); *G06Q 50/30* (2013.01); *G07B 15/04* (2013.01);
(Continued)

(58) Field of Classification Search
CPC ........ G08G 1/144; G08G 1/042; G08G 1/149; G06F 3/167; G06Q 50/30; G06Q 10/02;
(Continued)

(56) References Cited

U.S. PATENT DOCUMENTS 8,502,698 B2    8/2013   Chen et al.
2003/0224766 A1  12/2003  Stockhammer
(Continued)

FOREIGN PATENT DOCUMENTS

EP    1860616 A1 *  11/2007  ............. G07B 15/02

OTHER PUBLICATIONS

International Search Report dated Jul. 17, 2018 for or corresponding International Patent Application PCT/AU2018/050580, filed on Jun. 12, 2018.
(Continued)

*Primary Examiner* — Erika A Washington
(74) *Attorney, Agent, or Firm* — David D. Brush; Westman, Champlin & Koehler, P.A.

(57) ABSTRACT

A computer-implemented parking system including: a driver mobile electronic device configured to transmit a parking lot entry signal and a parking lot exit signal, and a coordinating computer system configured to receive the parking lot entry signal and the, parking lot exit signal, computer-controllable vehicle entry and vehicle exit barriers in communication with the coordinating computer system. The coordinating computer system is configured to: upon receipt of the entry signal transmit an open signal to the computer-controllable entry barrier station, and upon receipt of the exit signal transmit an open signal to the exit barrier station. Each entry and exit barrier station may include a receiver to receive the entry signal and parking lot exit signal, respectively. The receiver may be configured to detect or assist the coordinating computer system to detect, position of the driver
(Continued)

mobile electronic device with reference to the computer-controllable entry or exit barrier station.

20 Claims, 14 Drawing Sheets

(51) Int. Cl.
| | |
|---|---|
| *H04B 17/318* | (2015.01) |
| *G06F 3/16* | (2006.01) |
| *G06Q 50/30* | (2012.01) |
| *G07B 15/04* | (2006.01) |
| *G08G 1/042* | (2006.01) |
| *H04W 4/021* | (2018.01) |
| *H04W 4/02* | (2018.01) |
| *G06Q 10/02* | (2012.01) |

(52) U.S. Cl.
CPC ............ *G08G 1/042* (2013.01); *G08G 1/149* (2013.01); *H04B 17/318* (2015.01); *H04W 4/021* (2013.01); *H04W 4/023* (2013.01); *H04W 4/029* (2018.02); *G06Q 10/02* (2013.01); *G06Q 2240/00* (2013.01)

(58) Field of Classification Search
CPC .... G06Q 2240/00; G07B 15/04; G07B 15/02; H04B 17/318; H04W 4/021; H04W 4/023; H04W 4/029
See application file for complete search history.

(56) References Cited

U.S. PATENT DOCUMENTS

| | | |
|---|---|---|
| 2004/0012481 A1 | 1/2004 | Brusseaux |
| 2012/0265585 A1 | 10/2012 | Muirbrook |
| 2014/0232518 A1 | 8/2014 | Stoehr |
| 2015/0025947 A1 | 1/2015 | Dutta et al. |
| 2015/0095123 A1 | 4/2015 | Wenninger |
| 2016/0042575 A1 | 2/2016 | Ganguly et al. |
| 2017/0300803 A1* | 10/2017 | Beavers ................. G07B 11/00 |

OTHER PUBLICATIONS

Written Opinion of the International Searching Authority dated Jul. 17, 2018 for corresponding International Patent Application PCT/AU2018/050580 filed Jun. 12, 2018.

\* cited by examiner

COMPUTER-IMPLEMENTED SYSTEMS FOR LOCATING A VEHICULAR PARKING SPACE AND CONTROLLING ACCESS THERETO

The present application is a Section 371 National Stage Application of International Application No. PCT/AU2018/050580, filed Jun. 12, 2018, which is incorporated by reference in its entirety and published as WO 2018/227241 A1 on Dec. 20, 2018, in English, which claims priority from Australian provisional patent application 2017902270, filed Jun. 15, 2017.

FIELD OF THE INVENTION

The present invention relates to computer-implemented means for guiding and/or controlling the access of vehicles to a parking space. Also provided are electronic means for a user to pay for a parking space.

BACKGROUND TO THE INVENTION

Access to a commercial vehicular parking lot is typically controlled by way of a computer-controlled boom gate. A driver having approached the boom gate will generally lean through the vehicle window and press a button on an entry station. A computer system of the parking lot directs the entry station to print a paper ticket having information encoded thereon. Given that most parking lots charge on a time basis, the ticket will record at least the time of entry in computer readable form. Upon removal of the ticket from the entry station an electronic signal is transmitted to raise the boom gate.

Before exiting the parking lot, the driver inserts the ticket issued upon entry into a pay station which reads information encoded thereon. A processor of the parking lot computer system calculates the fee due (often based on elapsed time), accepts correct payment from the driver and encodes a computer readable message on the ticket to reflect correct payment having been received.

The driver then drives the vehicle to an exit station having a boom gate which prevents exit from the parking lot. The driver leans through the vehicle window and inserts the ticket into the exit station which reads the computer readable message. Having confirmed correct payment has been made, the computer system of the parking lot raises the boom gate to allow the vehicle to exit.

The scenario presented above (and other vehicular parking scenarios) present a number of problems. One problem is the need for the driver to execute many physical actions, such as winding down and winding up the vehicle window and reaching outwardly so as to receive and deposit a ticket from or to the entry and exit stations respectively. Many driver find such actions physically taxing or sometimes impossible. In one instance, the act of leaning out of a car window to insert a parking ticket lead to the death of a driver in Queensland, Australia on 3 Aug. 2016 (Australian Associated Press). The driver accidentally depressed the accelerator pedal while leaning through the window, causing the car to surge forward and the driver's head to impact on a boom gate housing.

In any event, even the short amounts of time taken to receive and deposit the ticket at the entry and exist stations can lead to queues of some length at the entry and exit stations. Another problem is the need for a driver to ensure that sufficient cash or a credit card is available for payment of the parking fee. A further problem presents if a ticket is lost or damaged.

Problems present even before a driver approaches a parking lot. It is often the case that a driver seeking a casual parking space will need to check multiple parking lots to locate one having a free space. Even when a space is found, the driver may not consider the parking fees to be reasonable and may therefore further continue searching for a lower cost space.

It is an aspect of the present invention to provide computer-implemented parking systems which overcome or ameliorate a problem of the prior art, including but not limited to any problem recited supra. It is a further aspect to provide a useful alternative to prior art parking systems.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In a first aspect, but not necessarily the broadest aspect, the present invention provides a computer-implemented parking system comprising: a driver mobile electronic device configured to transmit a parking lot entry signal and a parking lot exit signal, and a coordinating computer system being configured to receive the parking lot entry signal and the parking lot exit signal, computer-controllable vehicle entry and vehicle exit barriers in operable communication with the coordinating computer system, wherein the coordinating computer system is configured to: upon receipt of the parking lot entry signal transmit an open signal to the computer-controllable entry barrier station, and upon receipt of the parking lot exit signal transmit an open signal to the computer-controllable exit barrier station.

In one embodiment of the first aspect, each of the computer-controllable entry and exit barrier stations comprise a receiver configured to receive the parking lot entry signal and parking lot exit signal respectively.

In one embodiment of the first aspect, the receiver is configured to detect, or to assist the coordinating computer system to detect, the position of the driver mobile electronic device with reference to the computer-controllable entry or exit barrier station.

In one embodiment of the first aspect, the computer-implemented parking system comprises two, three, four or more of the receivers configured to receive the parking lot entry signal or the parking lot exit signal of an entry lane or an exit lane, the two, three, four or more receivers positioned or otherwise configured so as to together provide an indication of the location of the driver mobile electronic device with reference to the computer-controllable entry or exit barrier station.

In one embodiment of the first aspect, the strength of two or more parking lot entry signals, or two or more parking lot exit signals are analysed by algorithmic means to provide an indication of the location of the driver mobile electronic device with reference to the computer-controllable entry or exit barrier station.

In one embodiment of the first aspect, the algorithm is based on a geometric location method including but not limited to triangulation, trilateration, or triangulateration.

In one embodiment of the first aspect, the driver mobile electronic device comprises means for transmitting a barrier actuation instruction so as to cause the computer-controllable vehicle entry or vehicle exit barrier to move from a closed position to an open position.

In one embodiment of the first aspect, the driver mobile electronic device is comprises voice processing means and is configured to transmit the barrier actuation instruction upon receipt of a voice instruction from a user of the driver mobile electronic device.

In one embodiment of the first aspect, each of the computer-controllable vehicle entry and vehicle exit barriers each has associated vehicle detection means configured to detect the presence of absence of a vehicle in a lane for which the computer-controllable vehicle entry or vehicle exit barrier controls entry or exit.

In one embodiment of the first aspect, the vehicle detection means is an inductive loop system disposed in the lane for which the computer-controllable vehicle entry or vehicle exit barrier controls entry or exit.

In one embodiment of the first aspect, the computer-implemented system is configured such that: (i) upon receipt of a parking lot entry signal from a driver mobile electronic device, and actuation of the vehicle detection means, the driver mobile electronic device being detected in about the same position as the actuated vehicle detection means, the receipt of the parking lot entry signal and actuation of the vehicle detection means occurring contemporaneously or within a predetermined time period, the computer-controlled vehicle entry barrier is moved from a closed position to an open position, or (ii) upon receipt of a parking lot exit signal from a driver mobile electronic device, and actuation of the vehicle detection means, the driver mobile electronic device being detected in about the same position as the actuated vehicle detection means, the receipt of the parking lot exit signal and actuation of the vehicle detection means occurring contemporaneously or within a predetermined time period, the computer-controlled vehicle exit barrier is moved from a closed position to an open position.

In one embodiment of the first aspect, the coordinating computer system is further configured to calculate a parking fee based on the absolute time of receipt of the parking lot entry signal and the absolute time of receipt of the parking lot exit signal, or the time elapsed between receipt of the parking lot entry signal and receipt of the parking lot exit signal.

In one embodiment of the first aspect, the computer-implemented parking system comprises a payer financial entity computer system in operable communication with the coordinating computer system, the payer financial entity computer system configured to electronically transmit funds from a parking fee payer account to a parking fee payee account of a payee financial entity computer system.

In one embodiment of the first aspect, the coordinating computer system information is in operable communication with one or more databases holding substantially up to date information on the availability or non-availability of a plurality of parking spaces at one or more parking lots, and the coordinating computer system being configured to transmit the information on the presence or absence of one or more available parking spaces at one or more parking lots to the driver mobile electronic device or other driver electronic device.

In one embodiment of the first aspect, the driver mobile electronic device is location-enabled, and the coordinating computer system is configured via software algorithmic means identify the presence or absence of an available parking space at a parking lot which is geographically proximal to the location reported by the driver mobile device, the coordinating computer system being further configured to transmit information on the presence or absence of an available parking space at a parking lot which is geographically proximal to the location reported by the driver mobile device.

In one embodiment of the first aspect, the coordinating computer system or the driver mobile electronic device is configured determine a route between the location of the driver mobile electronic device and an identified available parking space at a parking lot geographically proximal thereto, and via the driver mobile electronic device, to output visual or audio instructions to a user of the driver mobile electronic device so as to guide the user to an available parking space.

In one embodiment of the first aspect, the computer-implemented parking system further comprises a parking space booking computer system having access to a database comprising substantially up to date information on the availability or non-availability of a plurality of parking spaces at one or more parking lots, the parking space booking computer system configured to: (i) receive booking query information from a user electronic device, the booking query information comprising any one or more of: preferred parking location, preferred parking start time, preferred parking end time, preferred parking period, and maximum parking fee, (ii) search the database comprising information on the availability or non-availability of the plurality of parking spaces at one or more parking lots, the search having reference to the information at (i), (iii) transmit to a user electronic device information on one of more available parking spaces, and (iv) receive from a user electronic device a confirmation signal so as to book a parking space.

In a second aspect, the present invention provides a method for entering and/or exiting a parking lot, the method being executed by use of the computer-implemented parking system according to any embodiment of the first aspect, the method comprising the steps of: the driver of a vehicle having disposed therein the driver mobile electronic device approaching a computer-controllable vehicle entry and/or vehicle exit barrier of a parking lot, causing or allowing a parking lot entry signal and/or exit signal to be transmitted from the driver mobile electronic device, and causing or allowing the coordinating computer system to transmit an open signal to the computer-controllable entry barrier station and/or computer controllable exit station.

In one embodiment of the second aspect, the method is devoid of the step of the driver contacting a vehicle window control, or the step of the driver contacting the driver mobile electronic device, or the step of the driver vocalising a voice command to the driver mobile electronic device, or the step of the driver contacting the computer-controllable entry barrier station and/or computer controllable exit station, or the step of the driver contacting a parking ticket, or the step of the driver inserting a parking ticket into a pay station, or the step of the driver contacting a debit card or a credit card.

In one embodiment of the second aspect, the method is devoid of any active step on the part of the driver to pay a parking fee whilst in the process of entering or exiting a parking lot.

DETAILED DESCRIPTION OF THE INVENTION

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects apply to specific exemplary embodiments, and not necessarily to all embodiments covered by the claims.

Throughout the description and the claims of this specification the word "comprise" and variations of the word, such as "comprising" and "comprises" is not intended to exclude other additives, components, integers or steps.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may.

Certain advantages of some embodiments of the invention are disclosed herein. It is not represented that all embodiments have all the advantages disclosed. Some embodiments may provide no advantage whatsoever over the prior art, and instead merely represent a useful alternative thereto.

Figure 1:
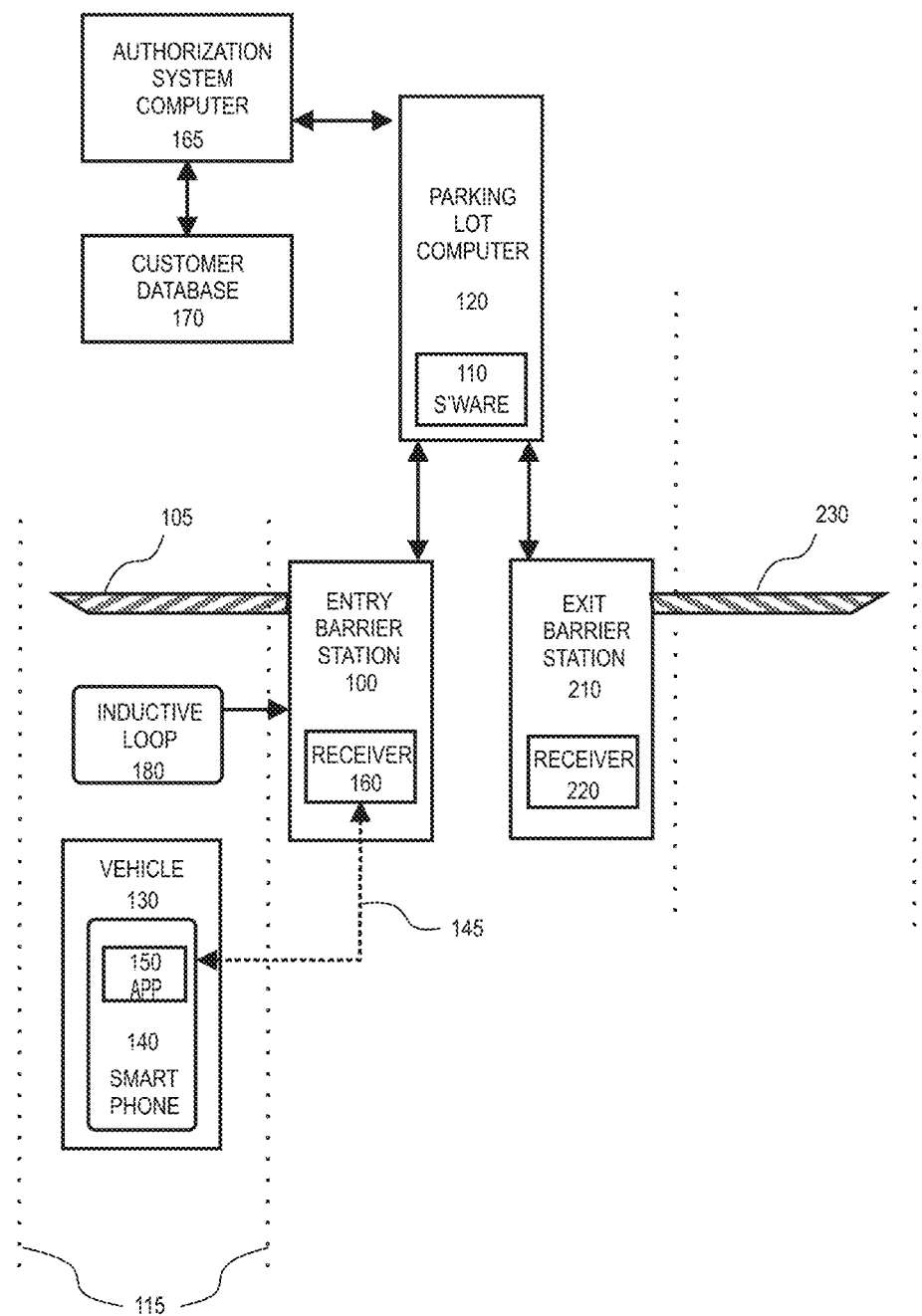
FIG. 1 shows a functional block diagram of an exemplary system of the present invention, and demonstrating the situation where a vehicle is preparing to enter a parking lot.

Referring to FIG. 1 there is shown a system of the present invention comprising an entry barrier system 100 having a boom gate 105 which is electrically operated by a motor (not shown), the motor being actuated under instruction from software 110 of the parking lot computer system 120. In the scenario of FIG. 1, a vehicle 130 having a driver (not shown), the driver having a smart phone 140, approaches the entry barrier station 100 in the entry lane 115 with the intention of entering the parking lot.

The smart phone 140 has application software 150 ("app") installed thereon configured to transmit an entry signal to the receiver 160 of the entry barrier station 100. In this preferred embodiment, the signal is transmitted from the smart phone 140 by BlueTooth™ radio frequency signal 145, and the receiver 160 is capable of receiving the BlueTooth™ signal.

The entry signal is a key code which is optionally stored by the application software 150 in the memory of smart phone 140. For added security, the key code may be a rolling code with the implementation of such codes in radio frequency transmission being well understood in the art. The receiver (by its dedicated associated hardware and/or software, or via some other processor) decodes the BlueTooth™ signal which is received and analysed by an authorization system computer 165.

Where the key code is found by the authorization computer system 165 to be valid, the authorization computer system interrogates a customer database 170 holding (in linked association with the key code) information relating to the customer associated with the smart phone 140. Such information may include financial information with regard to the validity or currency of any credit card, debit card, bank account or the like from which funds for the impending parking session to be withdrawn. The authorisation system computer 165 checks the customer's financial credentials and if funds are available to draw a messages is transmitted to the parking lot computer 120 to cause the boom gate 105 of the entry barrier station 100 to open.

The smart phone 140 may transmit the key code in response to a manual instruction by the smart phone 140 user, by way of the user issuing a voice command or by manually pressing a virtual button on a user interface generated by the app 150. For example, the smart phone 140 user (who is also the driver of the vehicle to be parked) approaches the entry boom gate of a parking lot and stops just short of the gate. The app is already running, and the user touches a virtual button denoting "enter", or vocalises "enter" to cause the boom gate to open.

Time of entry of the smart phone 140 is recorded in the parking lot computer 120 by way of software 110. This recordation is for the purpose of calculation the parking fee upon exit as more fully described infra.

In some embodiments, the receiver is also a radio beacon broadcasting a signal (via BlueTooth™, for example), the signal advertising the presence of a system configured to interact with the app 150 of the smart phone 140. In that case, the app 150 receives the broadcast signal and automatically transmits an "entry" instruction to the entry barrier station 100 via the receiver 160.

In other embodiments, the entry lane used by a vehicle to enter the parking lot incudes an inductive loop 180 configured to detect the presence or absence of a vehicle in front of the boom gate. Where the inductive loop 180 detects the presence of a vehicle, a signal is transmitted to the barrier entry station 100 to open the boom gate 105. The boom gate 105 will only be opened where a request for entry is transmitted from the smart phone 140, and the customer key code received by the barrier entry station 100 and the authorization computer 160 confirms (via checking for the presence of a valid payment gateway token associated with the user account) that the impending parking fee will be paid upon exit.

As will be appreciated, the present system allows for a driver to enter a parking lot without the need to stop at an entry station, open the vehicle window, activate a hardware button on the entry station, remove a ticket from the parking station, and store the ticket on his/her person. These actions are required by prior art parking lot entry systems, and cause significant delay upon entry of each vehicle and associated effort on the part of the driver.

The signals transmitted between the smart phone 140 and receiver 160 are preferably made by way of short range radio transmission means such as BlueTooth™, and particularly low energy BlueTooth™, having a particularly short range.

The relatively short range of Bluetooth™ signals is very well suited to the present systems, and indeed may be limited by the use of Class 2 devices (2.5 mW, 4 dBm, typical range of about 10 meters). In many applications, a range of 10 meters will be too great, and so signal attenuation means may be implemented at the transmitter and/or receiver end so as to limit effective range to less than about 5 meters, 4 meters or 3 meters. Attenuation may be provides by decreasing the power of a transmitter of the gain of a receiver, for example An advantage of short range transmission means is that any key code transmitted by the smart phone 140 and any beacon transmitted by the receiver 160 is essentially restricted to the parking lot entry lane in which the vehicle 130 carrying the smart phone 140 is using. Thus, any entry signal transmitted from the smartphone 140 is received only by the receiver on the relevant barrier entry station and not by an entry station of an adjacent lane (be it an entry lane or an exit lane of the parking lot). In some embodiments, the entry signal is received by a receiver in an adjacent lane but the system detects that the signal energy is low and essentially disregards it.

By the judicious use of the radio wave signals, the system is enabled to identify the lane in which the vehicle containing the smart phone is approaching, and activating only the boom gate for the lane.

Figure 2:
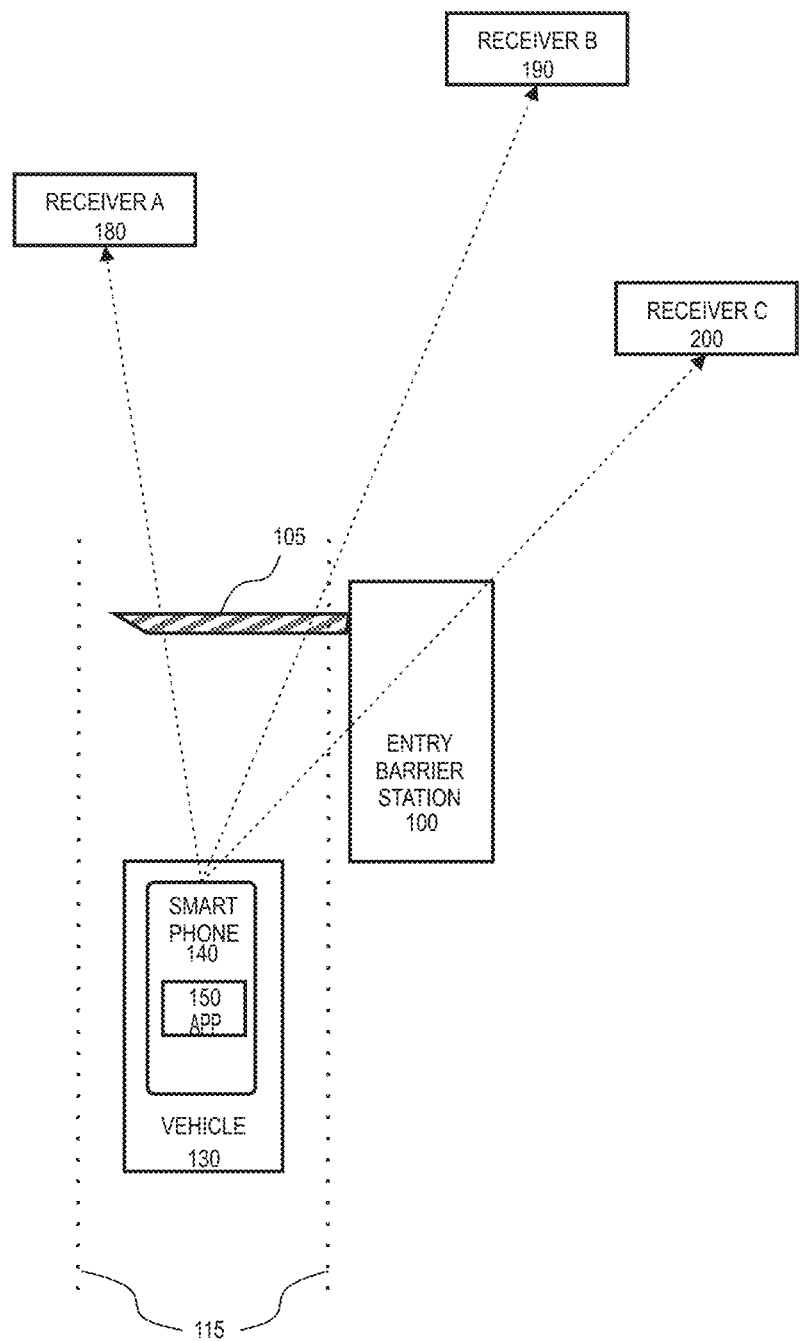
FIG. 2 shows a functional block diagram of an exemplary triangulation system configured to locate the position of a vehicle with reference to an entry lane of the parking lot.

This lane-specificity feature may be achieved by other means, including the use of multiple receivers any of which may or may not be mounted on or about an entry station or exit station. The present system may be configured to receive input from two, three or more receivers and to utilise the input to determine the lane from which the signal has been transmitted. For example, where three receivers are used the present system may incorporate at the software level a triangulation method to identify the physical position of the radio signal source, and therefore the lane from which the signal is transmitted. Reference is made to the exemplary triangulation system shown in FIG. 2 having three receivers A, B, and C (180, 190, and 200 respectively) each capable of receiving the entry signal transmitted by smart phone 140. Each of receivers 180, 190 and 200 may be configured to provide directional information and/or signal strength information (which may be translated into distance estimations) to allow for any calculations necessary to provide location information.

A triangulation method (being only one example of a geometrical location method) may provide advantage over other methods. For example, the use of strategies reliant on signal strength, the use of directional receivers and the like are prone to interference from radio opaque or radio reflective bodies which may be disposed in the line of sight between transmitter and receiver. A triangulation method obviates such issues by providing a clear result based on a geometrical consideration of three transmission signals. Some redundancy may be built into the triangulation system (by including greater than three receivers) such that where a body interferes with one receiver, a further receiver (which is not adversely affected by the body) is recruited to provide the third receiver required for triangulation.

In the present system, the receivers used to locate the origin of the entry or exit request signal is not a directional antenna, and may be an omnidirectional antenna. As will be appreciated from the above, the use of geometric means (such as triangulation) to locate the signal origin is preferred over means reliant on directional antennae which are configured to focus on a specific entry or exit lane. It is technically very difficult if not impossible to use directional antennae so as to locate a signal to a specific lane of the parking lot. Accordingly, in one embodiment the system is devoid a directional antenna and/or does not rely on a directional antenna so as to locate an entry or exit signal. Simple and low cost omnidirectional antennae may be used in the present system, which by way of geometric methods are able to locate a signal origin in many, if not all, circumstances.

In some embodiments, the absolute or relative signal strengths for each receiver are considered by the algorithmic means to more accurately locate the signal origin (and therefore the entering or exiting vehicle) to a specific lane. Thus, in deducing the location of the signal origin both the spatial arrangement of the antennae as well as the signal strength for each antenna In some circumstances, signal strength only may be used to locate the origin of a signal. Of course, the location of each antenna is nevertheless relevant to the deduction of the signal origin location, but no calculation (as may be required for triangulation) is required. In that regard, reference is made to the receiver arrangement more fully disclosed infra, whereby three receivers are used, and location of the signal is decided by comparison only of the signal strength for each receiver.

There are other advantages to Bluetooth™ such as the low cost of hardware, no requirement for a telecommunication license, and the availability of development platforms (include software development platforms).

The skilled person is familiar with the various available hardware devices for the transmission of Bluetooth™ signals. As one example, Texas Instruments (TX, USA) supplies a range of modules that are potentially applicable to the present systems, including the CC2560(Bluetooth™), LMX9838 (Simply Blue) and CC2564 (Bluetooth™+BLE), WL1271 (singlechip WLAN/Bluetooth™ device) and CC2564 (Bluetooth™/Bluetooth™ low energy or Bluetooth™/ANT) devices. The use of so called "Dual Mode" Bluetooth™ modules is also contemplated to communicate with mobile phones and tablets. In the market today, some devices have dual mode (Bluetooth™ and BLE) and other have only Bluetooth™.

The use of a Dual Mode module allows the present systems to be operable with devices through Bluetooth™, BLE or both.

As an alternative to Bluetooth™, the newer ANT/ANT+ radio transmission means may be used in the present systems. Over 18 million mobile devices are presently ANT/ANT+ enabled. ANT/ANT+ utilizes a simple protocol (which is sufficient for the present systems) and has a range equivalent to that of BlueTooth™ Low Energy (about 50 meters).

It is also contemplated that WiFi may be a useful protocol according to the present systems. The vast majority of smart phones and tablets are WiFi-enabled, and the range is controllable by modulation of power settings.

In some circumstances an algorithm of the park lot computer 120 is unable to easily locate a vehicle to a specific lane of the parking lot entry/exit. For example, the smart phone 140 may be in possession by a passenger of the vehicle 130, and in which case the entry signal is not detected as most proximal to the lane actually used by the vehicle 130. Instead, the receiver of the adjacent lane may receive an entry signal which is stronger than that received by the receiver of the actual entry lane.

In that circumstance, the system algorithm may have reference to the entry signal strengths received by the receivers of both lanes. Where at least some signal is detected by a receiver of the actual entry lane, but a stronger signal is detected by the receiver of the adjacent lane this may be interpreted by algorithmic means as the smartphone being positioned on the passenger side of the vehicle, but nevertheless the vehicle is located by the system to the lane having the receiver with the comparatively weaker signal.

In some embodiments, the adjacent lanes are covered by three receivers: one each at the outer lateral limits of the lanes (denoted receivers 1 and 3), and a central receiver (denoted receiver 2) disposed midway between the outer receivers. Entry lane 1 extends between receivers 1 and 2, while adjacent entry lane 2 extends between receivers 2 and 3. Where the smartphone 140 is in possession of a driver entering via lane 1, the receivers report relative signal strengths as follows: receiver 2>receiver 1>receiver 3. Where the smartphone 140 is in possession of a passenger entering via lane 1, the receivers report relative signal strengths as follows: receiver 1>receiver 2>receiver 3. Where the smartphone 140 is in possession of a passenger entering via lane 2, the receivers report relative signal strengths as follows: receiver 2>receiver 3>receiver 1. Where the smartphone 140 is in possession of a driver entering via lane 2, the receivers report relative signal strengths as follows: receiver 3>receiver 2>receiver 1. As discussed supra, this arrangement of omnidirectional receivers and consideration of respective signal strengths (and in the absence of any geometric algorithmic means) may be used as the sole means by which a vehicle is located to a specific lane.

Even by the use of the advanced lane location means described herein, in some circumstances an algorithm of the parking lot computer 120 may be unable to positively locate a vehicle to a specific lane of the parking lot entry/exit. The uncertainty may be caused by a car park attendant walking between a vehicle entering the parking lot and a receiver, or a malfunctioning BlueTooth™ transmitter of smartphone 140 for example In such circumstances, the system may be configured to transmit instructions (via BlueTooth™) directing the app 150 (via the user interface) to request confirmation from the driver of the lane in which the vehicle 130 is located.

The user interface may issue a synthesised voice query " Is your vehicle in lane 2" to which the driver may respond "yes" or "no" after checking physical identification markings on or about the entry lane. Where the response is "yes", the parking lot computer records lane 2 as the actual lane used by the vehicle and opens the boom gate of lane 2 only.

Where the response is "no", the user interface may issue a further voice query "Please say the number of the lane you are using", to which the driver may respond "one". In that case, the parking lot computer 120 records lane 1 as the actual lane used by the vehicle and opens the boom gate of lane 1 only.

The user interface may be optionally configured to issue lane confirmation queries by graphical means on the smartphone 140 screen, and the driver may respond by actuating a virtual button on the smartphone 140 touchscreen.

Returning to FIG. 1 it will be noted that the system comprises an exit barrier station 210 having a receiver 220, both of which operate similarly to the entry barrier station 100 and receiver 160. When vehicle 130 approaches the boom gate 230 of the exit barrier station 210, the user actuates a virtual "exit" button on a user interface of the app 150, so as to transmit an exit signal to the receiver 220. The exit signal comprises a key code that identifies the smart phone 140, via the parking lot computer 120 as the same smart phone that earlier entered the parking lot via entry barrier station 100. Time or receipt of the exit signal is recorded by parking lot computer 120.

The parking lot computer is configured (by software means) to utilize time of entry information and time of exit information so as to calculate an elapsed time, and in turn calculate a parking fee. The parking fee may be calculated by reference to the day of the week (for example, days of low patronage may attract a discount), the time of entry (a fixed "early bird" fee structure rate may be applicable where the entry is before a certain time), or the time of exit (an "early bird" fee structure may only apply where the exit is after a certain time).

Figure 3A:
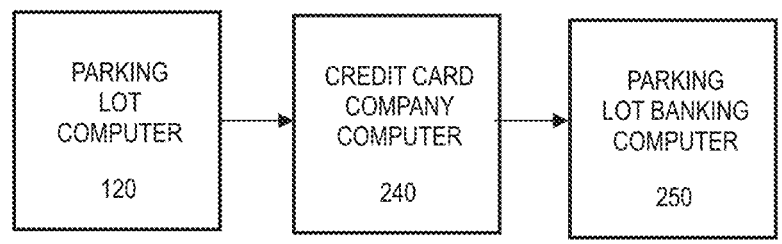
FIG. 3A shows a functional block diagram of an exemplary parking fee calculation and payment system.

Irrespective of how the parking fee is calculated upon exit, the fee payment is made by way of electronic debit of the credit card details held in the customer database 170. As shown in FIG. 3A, the parking lot computer 120 transmits a debit instruction to credit card company computer 240 such that the parking fee is electronically transferred to a bank computer 250 which administers the parking lot banking account.

The present systems extend to arrangements whereby the parking fee is a fixed time-period fee, such as a monthly parking fee. In that circumstance, the parking lot computer 120 maintains an electronic record of whether or not the monthly parking fee is paid up at the time of vehicle entry to the parking lot. Where the fee is paid up, the computer system actuate the vehicle entry barrier to allow entry of the vehicle.

Figure 3B:
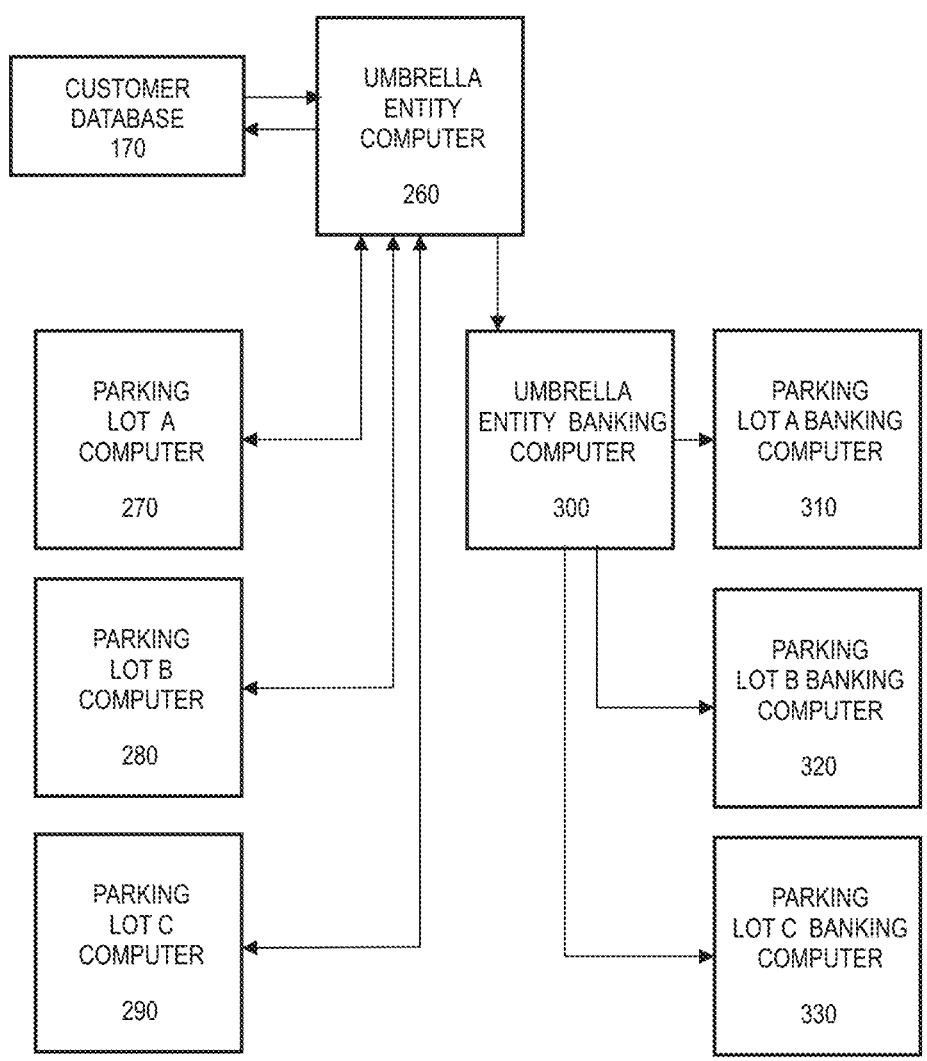
FIG. 3B shows a functional block diagram of an alternative parking fee calculation and payment system whereby an umbrella entity processes parking fee payment and retains a service fee.

In an alternative embodiment shown in FIG. 3B an umbrella entity computer 260 coordinates the parking arrangements for a number of parking lots (parking lot A, parking lot B and parking lot C . . . parking lot n). Each parking lot has a computer 270, 280, and 290 configured to calculate a parking fee as described previously with reference to entry and exit time recording. Each parking lot computer 270, 280 and 290 is in network connection with the umbrella entity computer 260, and is enabled to transmit a fee request, the fee being incurred by a customer in respect of parking services provided. Upon receipt of the request, the umbrella entity computer 260 interrogates customer database 170 to identify credit card details of the relevant customer. The umbrella entity computer 260 transmit a payment request to the relevant credit card company computer (not shown) and payment is received into bank account of umbrella entity (not shown). Umbrella entity computer 260 then instructs the computer of its bank 300 to electronically transmit the parking fee to the banking computer of the relevant parking lot (310, 320 or 330). Typically, the umbrella entity withholds a service fee from the relevant parking lot.

Alternatively, payment is made via an independent payment gateway computer that is in operable communication with the parking lot computer or the umbrella entity computer. Typically, the payment gateway computer stores user credit card details and is PCI DSS compliant. In a general scheme, the user passes credit card information to the merchant (which may be an umbrella entity or a car parking provider). The merchant submits the user's credit card information to the payment gateway computer. The payment gateway computer issues the merchant with a token (typically a numerical string) which references the user's credit card. The merchant stores the Token in linked association with the user account details. In this way, future transactions do not require credit card information to be submitted to the payment gateway. The merchant removes and replaces the credit card information with the token for processing future transaction The umbrella entity (or any other entity) may perform a further function of identifying available parking lots within a geographical area. Many parking lots have computer-implemented means for tracking the number of available parking lots. Such means may be a based on a simple calculation based on the number of vehicles having entered the lot, the number of vehicles having left the lot, and the total number of parking spaces. More sophisticated means such as imaging means monitoring each parking space may be used. In any event, parking space availability information may be utilised as an input in preferred embodiments of the system.

Figure 4:
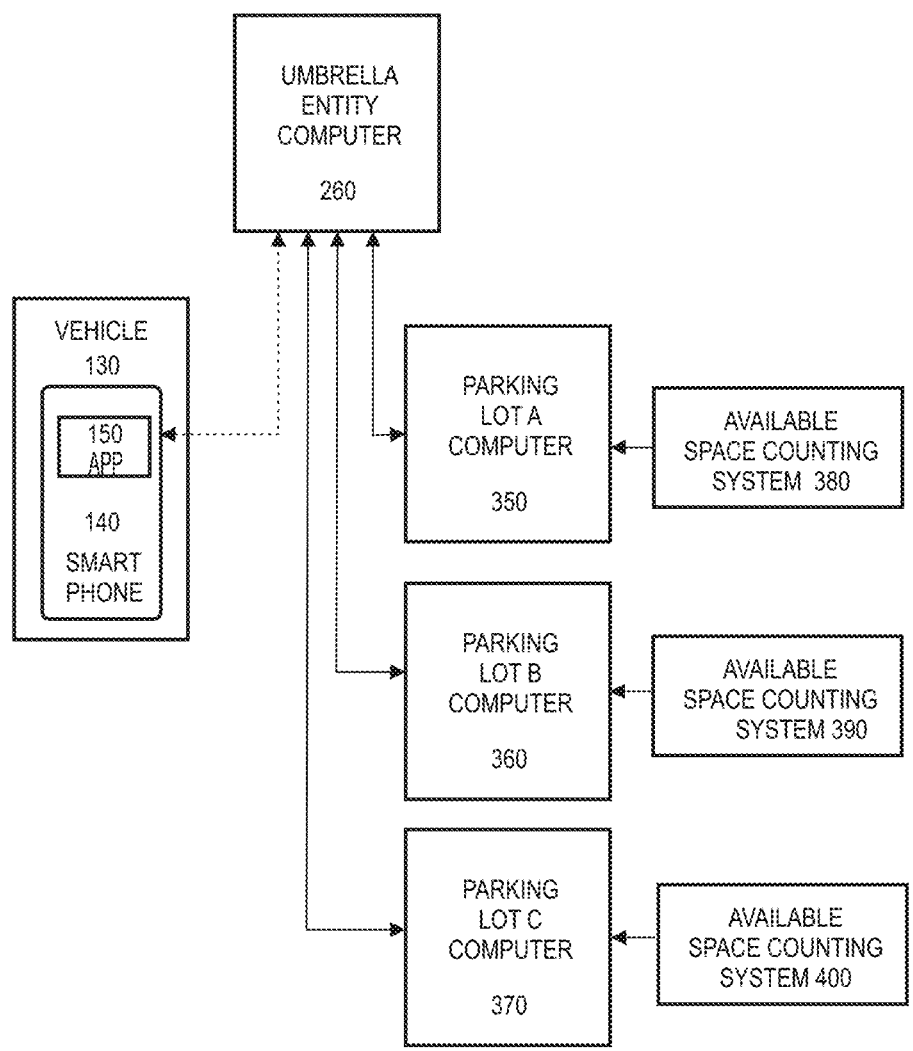
FIG. 4 shows a functional block diagram of an exemplary system having the ability to report the availably of spaces across multiple parking lots.

As shown in FIG. 4, the system may comprise umbrella entity computer 260 in wireless data connection with smart phone 140. The smart phone 140 is that of a driver of vehicle 130, the driver seeking a parking space near the location of vehicle 130. The driver actuates a virtual button "find a parking space" presented by a user interface of app 150, thereby transmitting the request via cell phone network, along with location information obtained from smart phone 140 GPS location system. The umbrella entity computer 260 receives the request and location information and interrogates each of parking lot A, B and C computers (350, 360 and 370; each of which is a computer of a parking lot which is geographically proximal to smart phone 140).

Each of the parking lot computers 350, 360 and 370 have available substantially real time information on available parking spaces by way of an ancillary ultrasonics system (380, 390, 400 respectively), of the kind used in existing parking lots. Where a geographically proximal parking lot reports an available space to umbrella entity computer 260, this is transmitted to smart phone 140 and presented on a user interface of app 150.

Each of the parking lot computers 350, 360 and 370 may also have available parking fee information which is also transmitted to smart phone 140 via user interface presented by app 150. This fee information may be used by the driver to seek a proximal parking space at the most competitive fee.

The availability of a geographically proximal parking space (and optionally available at an acceptable fee) may cause the driver to drive vehicle 130 to the relevant parking lot. The system may be configured to allow entry via the relevant parking lot entry station according to any method described elsewhere herein. Preferably, the system is configured to allow the driver to enter the parking lot without the necessity of winding down vehicle 130 window, or actuating a hardware button on the entry station, or handling a parking ticket.

In some embodiments, the app 150 of smartphone 140 is configured (either by itself or in combination with other installed software such as Google™ maps) to guide the driver (by way of "turn-by-turn" voice prompts, for example) to the relevant parking lot.

In another embodiment, the system may be configured so as to provide a booking system which allows a driver to reserve a parking space at a desired location. Thus, a driver may use smart phone 140 with app 150, or a desk top computer having a suitable browser-based user interface, to locate a parking space proximal to a desired geographical location and at an acceptable parking fee. The driver may input into the app 150 or browser-based user interface the location of a business meeting (for example, by entering a street address of the meeting) along with the time period required for parking, and the app 150 or browser-based user interface may return one or more parking lots having an available space, optimally in conjunction with parking fee information. In this embodiment, the parking space availability is made available via a booking system database which is held by each parking lot computer, or alternatively by the umbrella entity computer.

The driver may select via the app 150 user interface or browser-based user interface, to book a parking space in a desired parking lot. The booking request is recorded on either umbrella entity computer 260 or the relevant parking lot computer 350, 360 or 370. As discussed supra, the system may be further configured to guide the driver to the parking lot having the booked parking space.

Further description of various non-limiting implementations of the present invention will now be provided.

Figure 5:
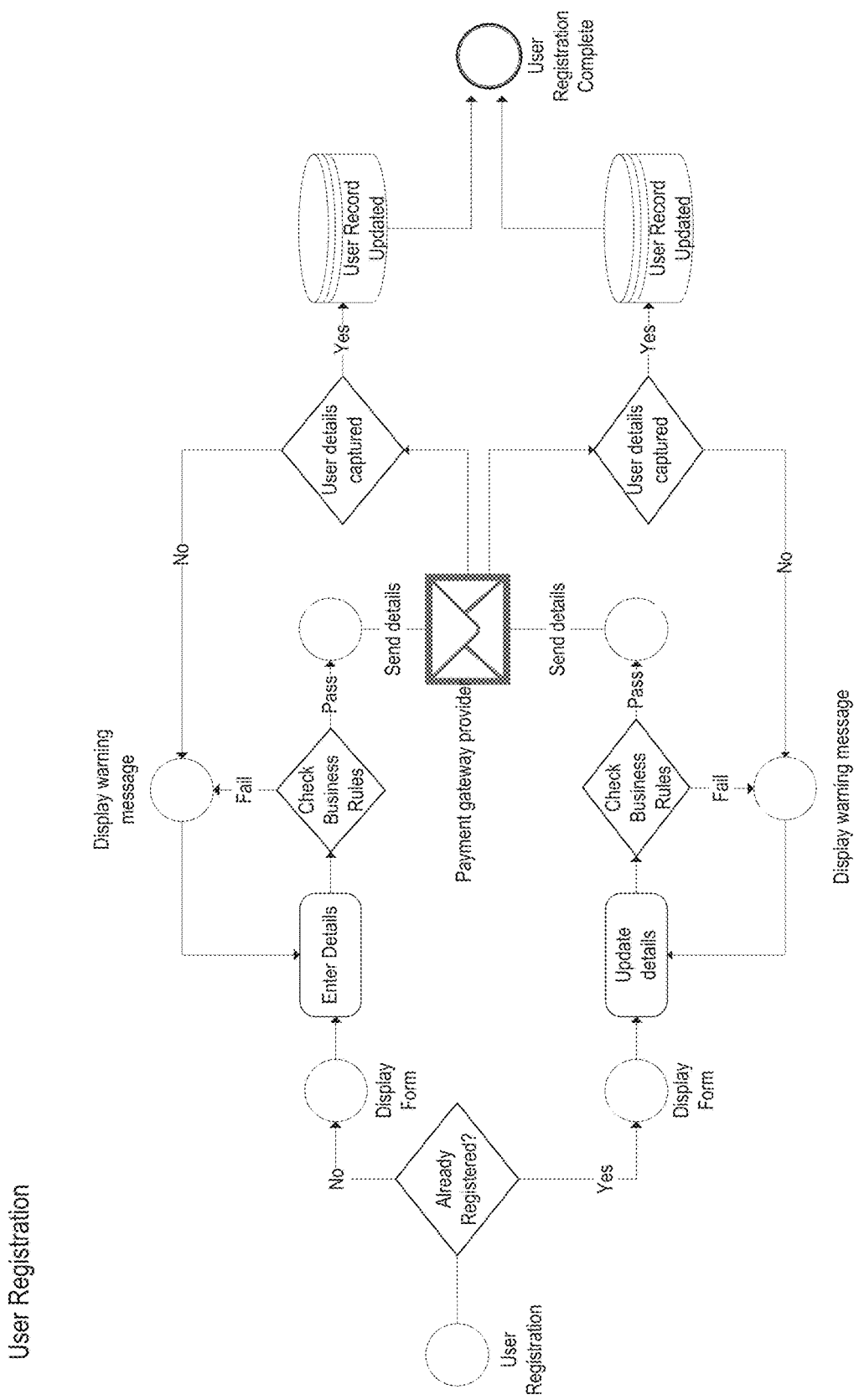
FIG. 5 shows a flow diagram of an exemplary user registration process.

Users of the present system are typically required to register their details including their credit card details in a registration process. Reference is made to FIG. 5. The registration is validated and all information secured. Credit card details may be encrypted and transferred to a payment gateway and stored meeting all PCI DSS compliance conditions.

Users download a dedicated mobile app and perform a registrations process where the following details will be collected by way of app user interface: Email, Password, First Name, Last Name, Mobile Number, Credit Card Number, Credit Card Name, CVV, Expiry Date, Promo Code, Ability to add more than one Credit Card (business/personal), Business name/code.

The user has the option to manually enter or scan credit card details that automatically stores the card information with a payment gateway.

Figure 6:
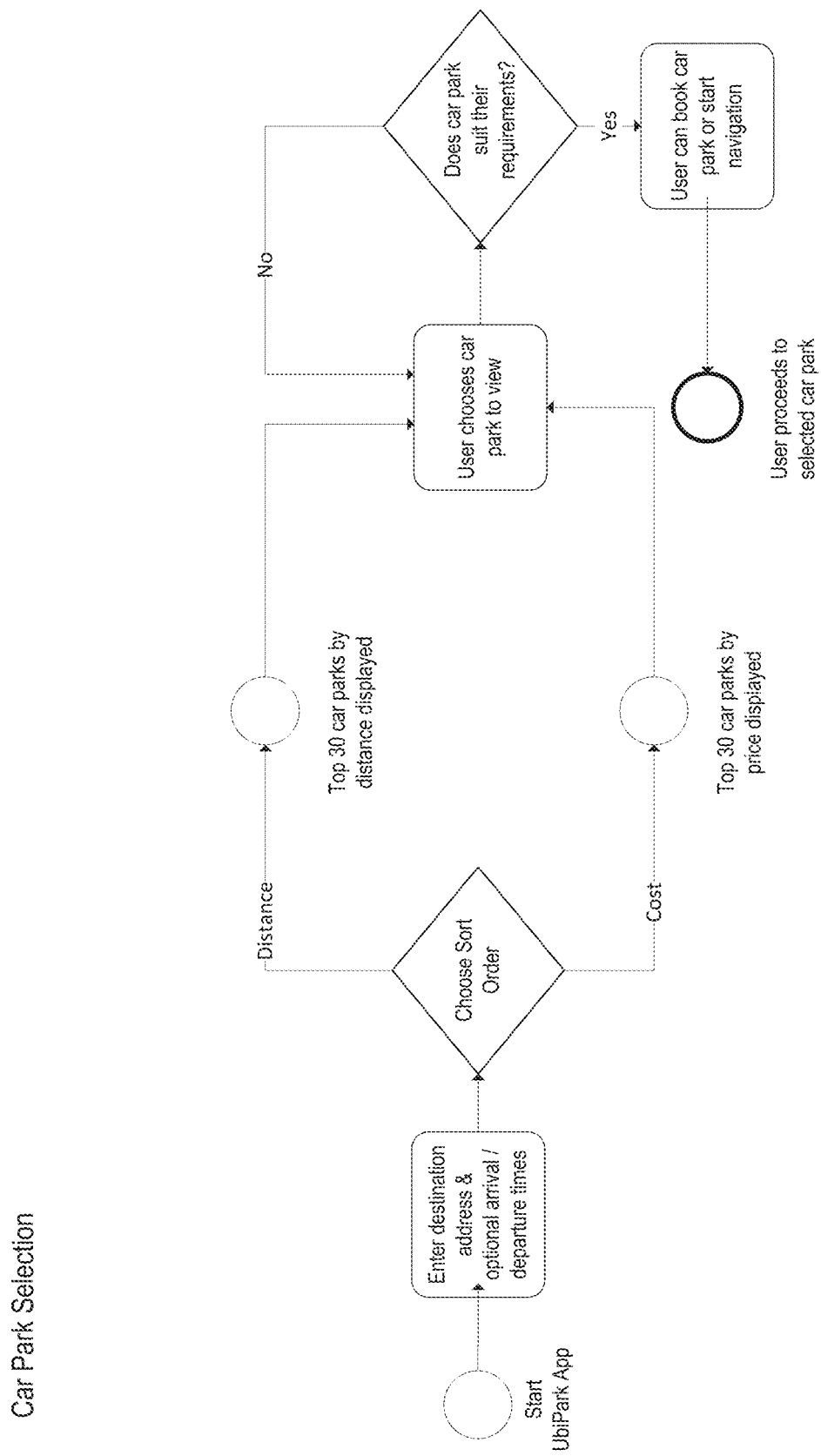
FIG. 6 shows a flow diagram of an exemplary parking space selection process.

The app user interface facilitates a parking lot selection process. Reference is made to FIG. 6. A user is enabled to compare parking lot locations and select the best location for their requirements. This is specific to each individual user: some users will be price conscious (and therefore seek cost effective parking) and others will be seeking for the closest parking location (and are largely unconcerned with cost).

The user interface of the app enables a user to search for a desired destination. This is performed by entering any one or more of the following items of information: street address, name of building, name of iconic location.

The system may be configured so as to allow the user (via the user interface) to filter parking lots based on any one or more of price, location, opening hours, number of vacant parking bays, height clearance; payment methods (including payment methods offered by a certain electronic payment entity), the presence of mobility bays, the presence of electric car charging facilities, the presence of car sharing bays, and user rating.

The user interface provides an option to enter the times (in o'clock) they expect to enter and exit the parking location. If no time is entered, the interface defaults to a time two hours from the time of the search.

The app user interface outputs search results displaying all known parking lots around the selected destination. Icons (shown on a map representation) show parking lots that are compatible with the present system (i.e. allow booking and/or entry and/or payment by way of the present system) in blue and all other locations shown in white.

If a parking lot is closed at either the entry or exit times selected it will be displayed in red on the app user interface.

If the parking lot provides real time available space counts to the present system then when the parking lot is full it will also display in red.

The user interface allows a user to can toggle between map and a list view. In list view the user is enabled to sort parking lots via distance to the desired location or by the cheapest for the times selected. In map view, the cheapest parking lot(s) will be displayed via a "$" symbol superimposed on the parking lot icon.

A parking lot may be selected by pressing on the icon on the map or the parking lot name in list view. Selection will provide further details of the parking lots as follows: fees, opening times, distance to the parking lot from current location, distance to the desired destination from the parking lot, height clearance, real time available space information, live vacancy, number of spaces, parking lot contact details (website, email and phone). The user then compares and selects the parking lot that best suits their requirements Parking lot information is stored so as to optimise geographical searches, continuous access to data will be made by fully redundant servers, servers will be scalable to ensure that large numbers of simultaneous requests can be handled in a timely manner.

Figure 7:
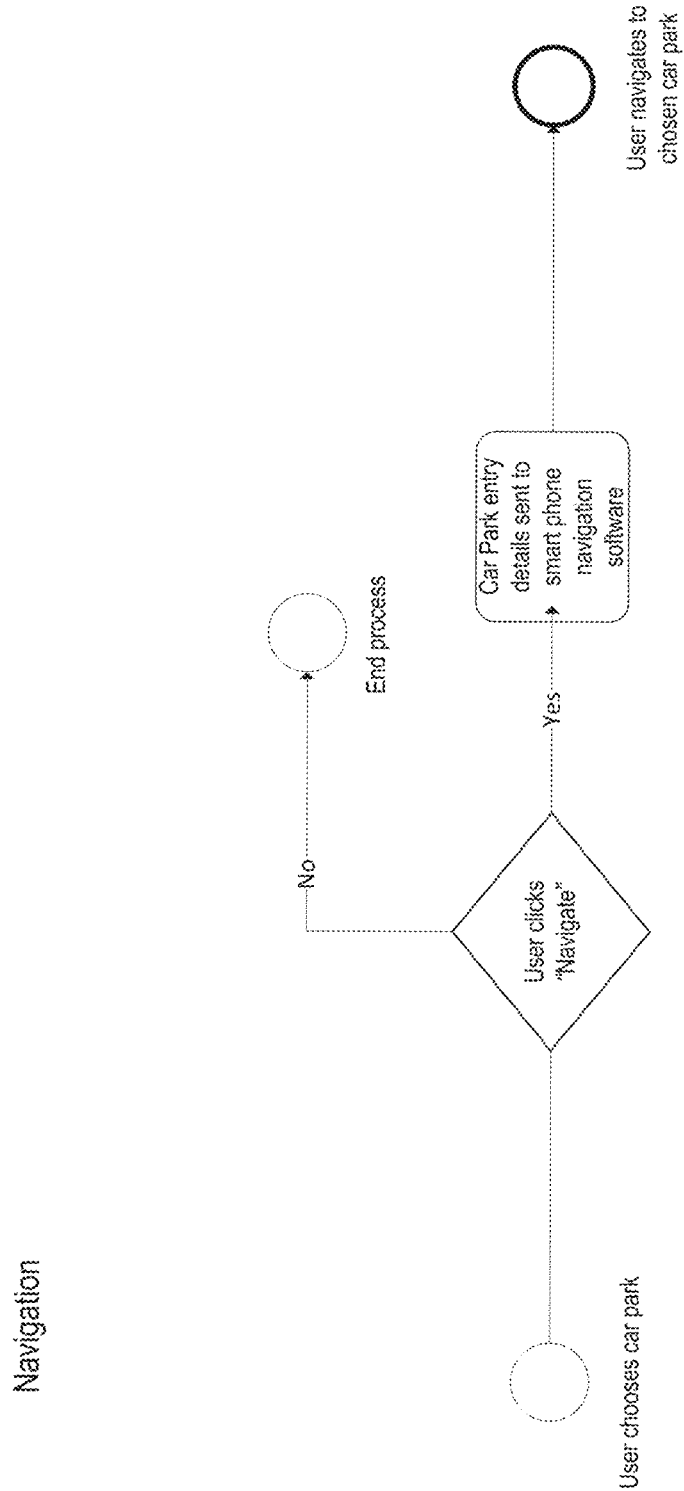
FIG. 7 shows a flow diagram of an exemplary navigation process.

In terms of navigation processes (as provided by app user interface, or other navigation interface coexisting in user smart phone), the interface will either indicate the parking location on a website or app and others will provide navigation to a street address. Reference is made to FIG. 7.

There are some parking lots where the entry to the parking lot is not at the building street address. This embodiment may therefore contribute to traffic congestion as users are directed to the wrong location. Preferably, the present system uses the GPS coordinates of each parking lot entry to navigate customers to the entry of the parking lot thereby reducing traffic congestion and saving users valuable time.

The app of the present system app has a navigation button attached to every parking lot location on the app. Once the user selects the parking lot most suitable for their requirements they can press the directions button and be navigated to the entry of the parking lot. The GPS coordinates of each entry lane of each participating parking lot is collected and stored into a server of the present system.

When the directions button is pressed, the app provides the start location and the server provides the end location and this is passed to Google™ maps, Apple™ Maps or Here™ Maps based on the user's preference. The user is then be directed by the most efficient way using the real-time traffic updates to the entry of the parking lot.

Figure 8:
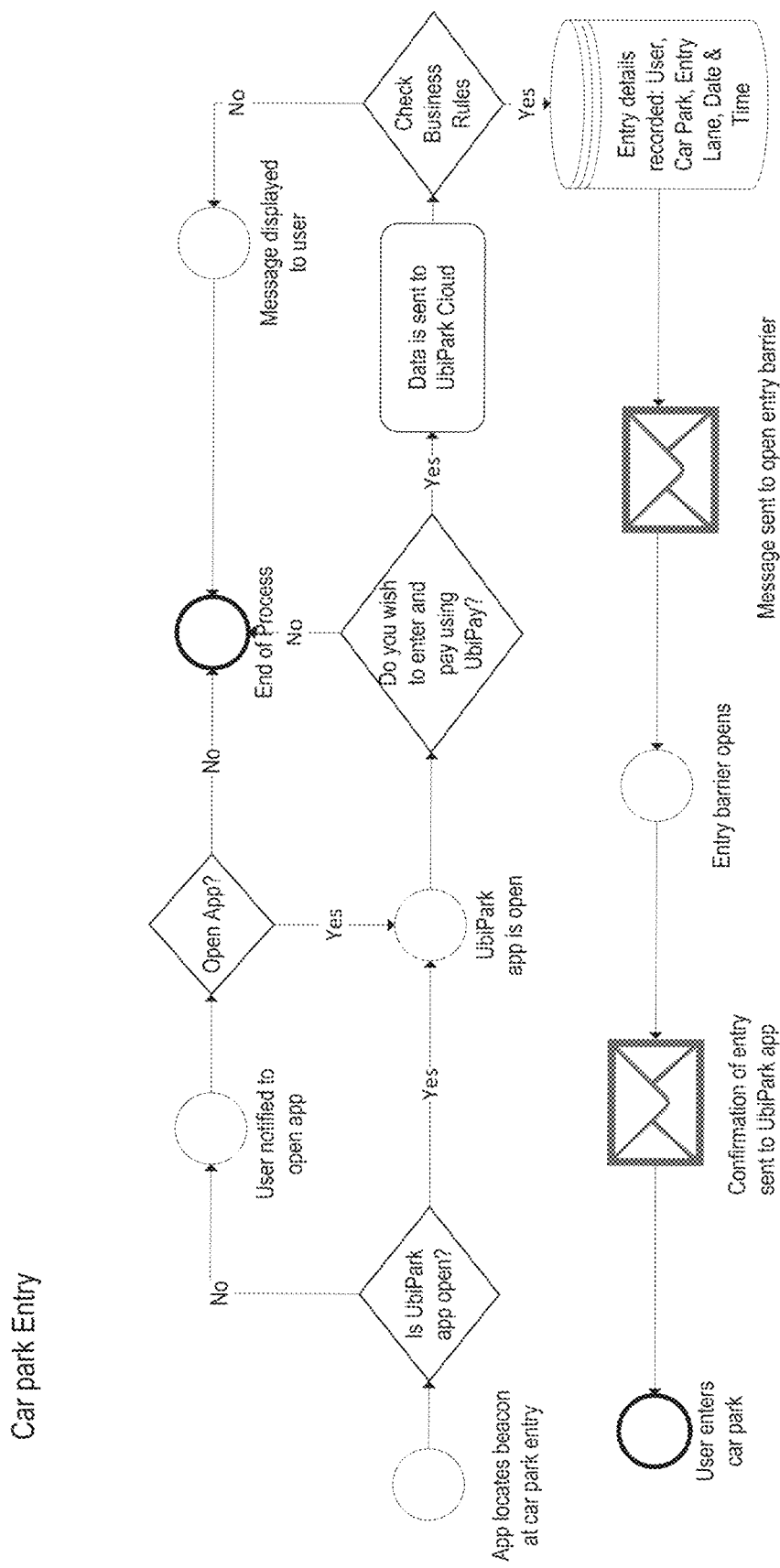
FIG. 8 shows a flow diagram of an exemplary parking lot entry process.

In terms of providing access via the parking lot entry barriers, the present system may be configured so as to allow for a user casual access. Reference is made to FIG. 8. The system may be configured so as to not require any need to book or register with each parking lot, operator or online digital parking operator. The driver may therefore drive directly to a desired parking lot (which also participates in the present system) and use the dedicated app to enter and pay.

Entry may be achieved using only a smart phone and voice commands The present system will open the parking lot barriers for entry to the partner parking lot, and without the need for a user to touch their smart phone to scan barcodes, or to search for PIN on an email, this increasing safety and convenience.

The use of a key code transmitted from a smart phone to identify a user is more convenient, accurate and cost effective than license plate recognition technology.

In terms of system tasks and functionality, when the user arrives at a participating parking lot they drive into the entry lane (or one of the entry lanes) of the parking lot.

The present system app identifies the lane used by applying a triangulation algorithm which analyses signals from various strategically placed beacons. Many parking lots have multiple entry lanes (and multiple exit lanes) that are very close together and it can be difficult to determine the exact lane in which a vehicle is approaching.

Once the entry lane has been identified the present system app will receive the lane identification signal from the beacon, and presented with a user interface asking if they wish to enter. The user confirms they wish to enter by way of user interface and pay via the present system.

Upon confirmation, the present system app communicates the following details to the system server: user account details, parking lot ID, entry lane ID, date, time.

The system server verifies the user accounts and records all details, and sends a request to the parking lot via the internet/router and ethernet network at the parking lot to the I/O board in the correct entry lane to open barrier. The user enters the parking lot and finds a parking space.

In terms of outcomes, the present system provides a parking lot access solution from a single software application that further provides a search, compare and navigation solution for vehicle parking. The system provides for improved user safety by the avoidance of any need for the user to touch the phone or enter a pin number at entry to a parking lot.

Figure 9:
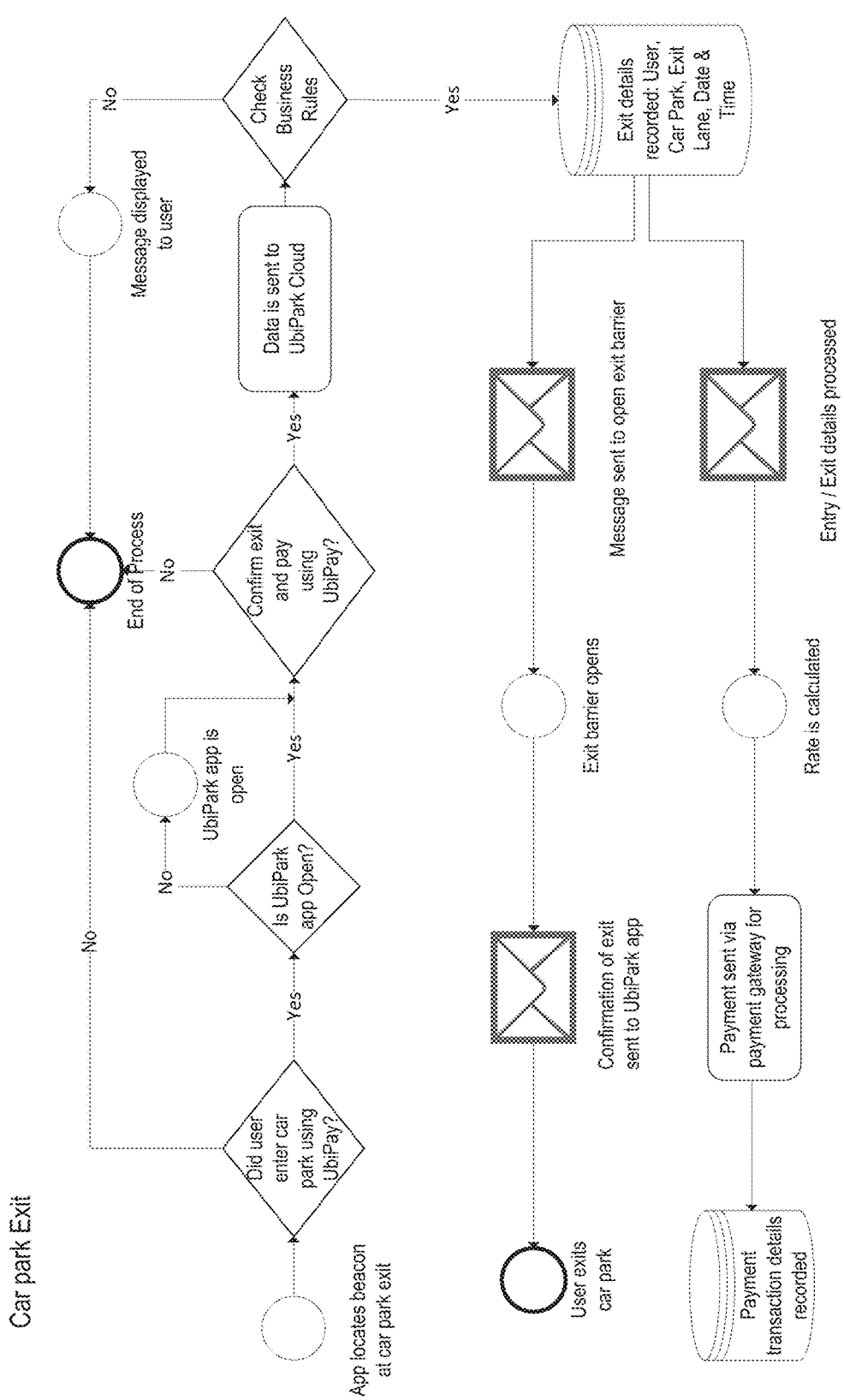
FIG. 9 shows a flow diagram of an exemplary parking lot exit process.

In reference to exit of a parking lot via an exit barrier, the user enters their car drives to an exit lane. Reference is made to FIG. 9. The exit lane may be identified by any means as for entry lane identification, and preferably by way of a triangulation algorithm receiving input from strategically placed beacons. Some car parks have multiple exit lanes that are very close together and it can be difficult to determine the exact lane.

Once the exit lane has been identified the app on the user smartphone receives the lane identification signal from a beacon. The customer confirms by way of app user interface that they wish to exit. At confirmation, the app communicates the following information to a system server: User Account Details, Car Park ID, Exit Lane ID, Date, Time.

The system server verifies user details and matches this with entry data. A parking fee calculation is made, and the fee amount is transmitted to payment gateway for processing as described elsewhere herein. The system server sends a request to the parking lot computer via the internet/router and ethernet network to the I/O board in the correct exit lane to open barrier. The user then exits.

Figure 10:
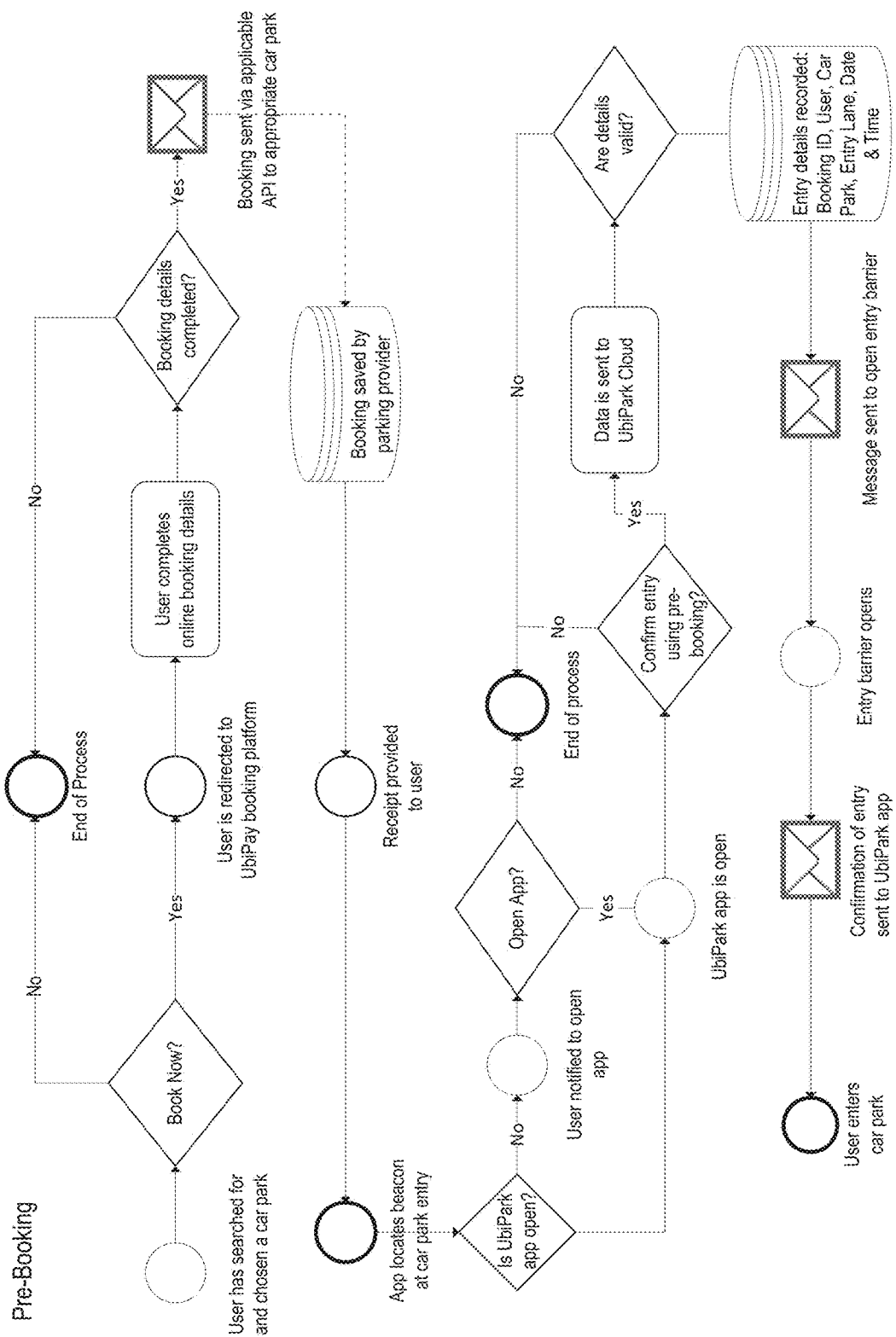
FIG. 10 shows a flow diagram of an exemplary parking space booking process.

In terms of pre-booking functionality, it is proposed that the system may function as an aggregator for online parking booking. Reference is made to FIG. 10. Using the search and compare functionality described above the user selects the parking lot and rate they wish to book. Payment is completed and booking made via a booking platform and payment gateway of the system. Access to the relevant parking lot is via the mobile app as described supra to enter and exit.

The system may require use of an API to allow for interface with the computer systems and data structures of multiple parking lots.

Reporting is via a platform of the present system as described infra.

Advantageously, the present system may provide an aggregated booking solution that does not require multiple accounts (i.e. an account with each parking lot company) in order to obtain the best prices across a number of parking lots.

Figure 11:
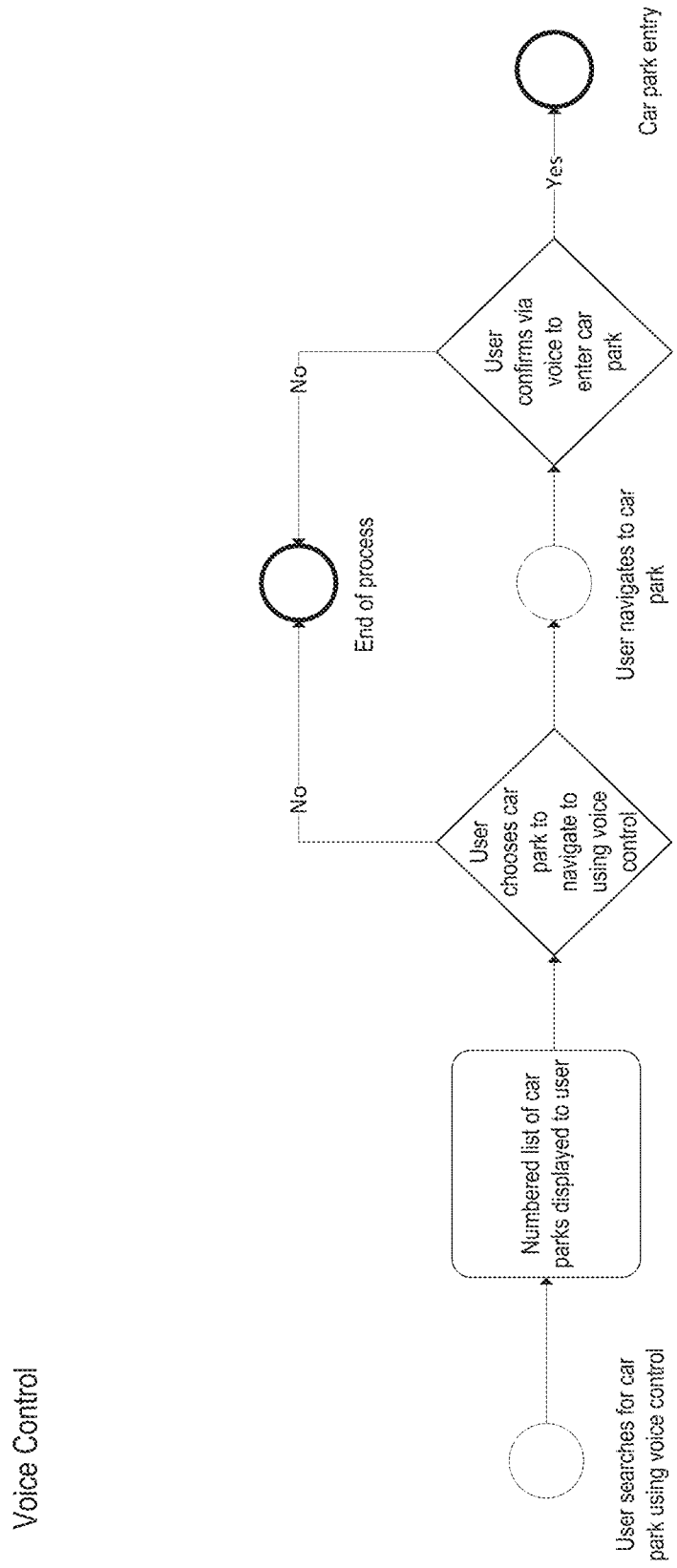
FIG. 11 shows a flow diagram of an exemplary voice control process.

The voice control functionality provides safety advantages when driving a car. Reference is made to FIG. 11. Voice control is used in some embodiments to activate key user requests when searching and confirming what the user desires the app to do.

The voice control function may allows a user to search for a parking space at a specific site. For example, the user may vocalise "locate 1 Queens Road". The result (by way of the app user interface) is the same as entering "1 Queens Road" into a search box however it may be produced in list view with numbers located next to each parking lot.

The voice control function may allow a user to navigate to a parking lot, and in which numerals are located adjacent to each parking lot that is on the parking map. The user may vocalise the command "navigate me too parking lot 4", and the result would be that directions from current location to entry of parking lot 4 open up in the Google™, Apple™ or Here™ maps.

In some embodiments, the system (generally by way of user interface of the app) provides the user the ability to opt in/out of the system, and therefore the ability to enter the parking lot. The opt in/out question may be raised by the app when the driver is in a parking lot lane. A simple yes/no voice command would be given by the driver to questions posed by the app. For example: App: "do you wish to enter the parking lot?"; Driver "Yes". The parking lot barrier then opens.

Figure 12:
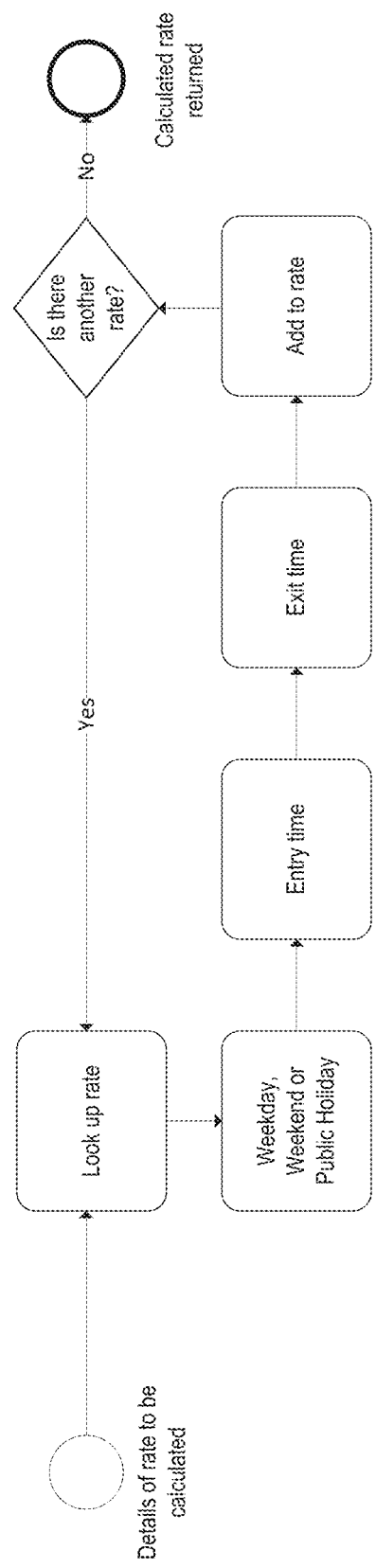
FIG. 12 shows a flow diagram of an exemplary parking space fee calculation process.

In terms of parking fee calculations, complications arise given many variables used by parking operators to arrive at the final fee payable by a customer. Reference is made to FIG. 12. In one embodiment, an umbrella entity computer executes an algorithm configured to process all parking rate structures of all participating parking lots. The algorithm may have regard to charge rates for multiple entry/exits during a time period that can only be completed after all the transactions have been collected during this period and calculated in arrears.

Regard may also be had to entry date and entry time, exit the date and exit time (these being recorded against the users account details and parking lot location). The exit data is married to the entry data and processed by the fee calculator.

The algorithm may incorporate a business rule, so as to provide a discount or a condition to an individual account and each specific parking lot.

Figure 13:
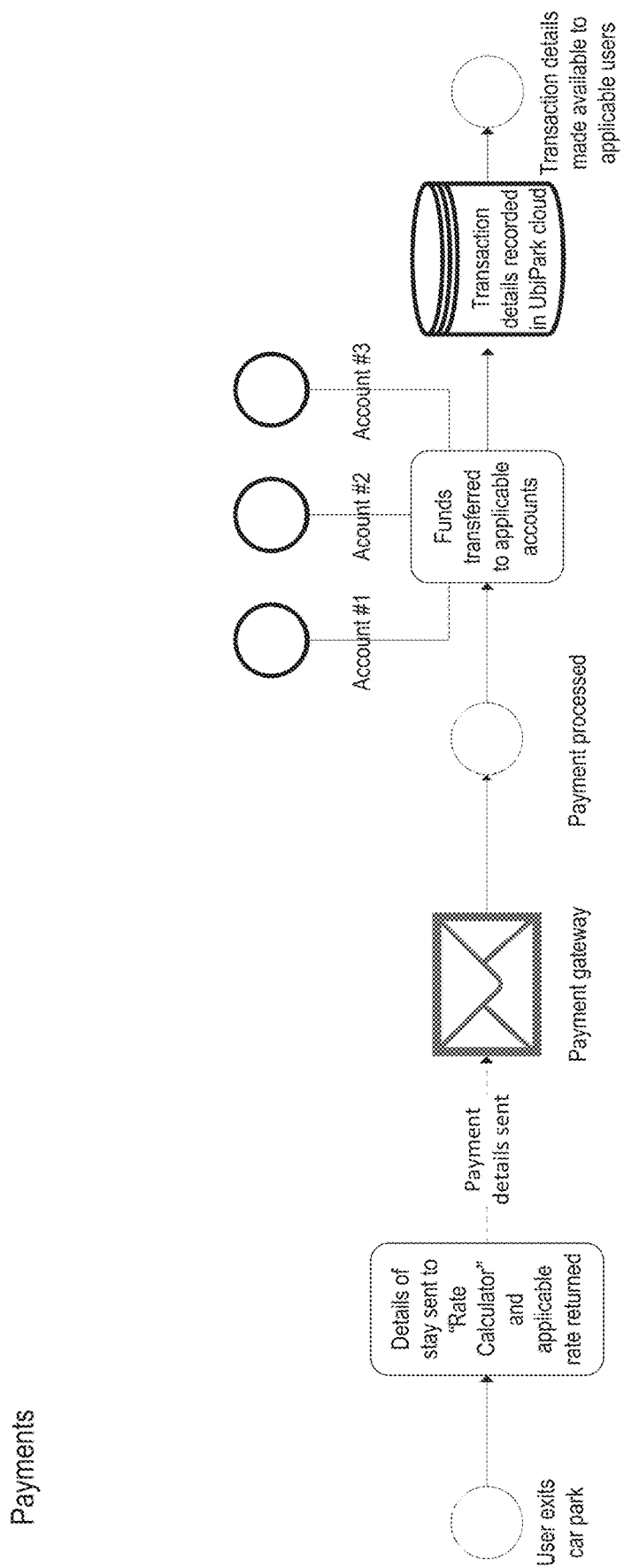
FIG. 13 shows a flow diagram of an exemplary parking fee payment process.

The final parking fee payable is recorded in the system database and transmitted to an associated electronic payment gateway for clearing. Confirmation of payment is transmitted by the gateway back to the present system indicating that the payment has been effected. After payment is made, proof of payment (such as a receipt, and optionally an invoice showing the payment of any tax) is emailed to the user. Reference is made to FIG. 13.

The payment solution provided by the present system meet Payment Card Industry Data Security Standard (PCI DSS). This is effected by integration with a certified payment gateway provider. There are many processes the payment gateway provider will performing the context of the present system as detailed below.

When the credit card details are entered during the user registration process, these details are stored in a manner meeting the PCI DSS requirements by the payment gateway. The payment gateway issues a token number that is stored against the user's account and is used to identify the correct user to the payment gateway. No credit card details are stored by the present system, and are instead retained by the payment gateway provider.

When the parking fee has been calculated, the present system transmits the amount along with the user's token number to the payment gateway provider in real-time. The payment gateway provider receives this information and process the payment via the user's credit card. Confirmation payment has been taken is then sent to the present system to close off the transaction and store for reporting purposes.

The present system may be configured to provide real-time or batch reporting to users, corporate customers and participating parking lots via a console interface. Users and corporate customers may access history for the last 10 transactions in the transaction history part of the app.

A user report may show details for recent activity such as date and time of entry, date and time of exit, duration, cost, and any discount applied.

If more details on any transaction is required, the user is able to login into their account via a secure web browser with password protection to view all transaction history.

Receipts are emailed at time of transaction and stored against the users account after payment. The user can access this information at any time.

The present system may comprise a corporate account reporting function. A corporate account administrator has access to all users associated with a given corporate account. The following reporting items are provided by the present system: overview of the corporate account information, department or cost centre information, individual user information, access to report on the entire account or view individual transactions.

An API may be provided to allow automatic export of account data into accounting packages such as Xero™, Quick Books™ and Concur™ to reduce corporate customer administration for parking expense claims.

The present system may provide a participating parking lot reporting function which provides access to all transactions that have taken place at the relevant parking lot. Audit reporting on revenue may be produced and optionally checked against customer bank records. Details of all commission payments (to an umbrella entity, for example) are shown on revenue reports in real-time. Other reporting items may include: number of transactions completed by the present system, breakdown of parking products purchased, and occupancy benchmarking reporting. Advantageously, the reports provide detailed information in real-time for auditing purposes, and trend analysis to assist in revenue growth strategies. Furthermore, efficient integrations with financial and other business applications increase administration efficiencies.

In terms of user experience (UX) and user interface (UI), the user app is configured to highlight (such as by the use of coloured icon) the parking lots which participate in the present system. Non-participant parking lots may be shown, but marked in white. The app displays the full range of information including parking rates, operating hours, height clearance, navigation details etc.

Details for non-partner sites (including parking rates) may also be included for comparative purposes only.

The app may provide an intercom feature which connects a user via VOIP to a control centre assistant. The intercom feature may provide a call button that connects the user with the control room assistant to commence two-way conversation with customer and control room similar to a phone call.

Other features may include use of the smart phone camera to allow video of the user and the situation the user is having trouble with. Applicant has recognised that many users can be assisted where the control operator can actually view the situation.

Figure 14:
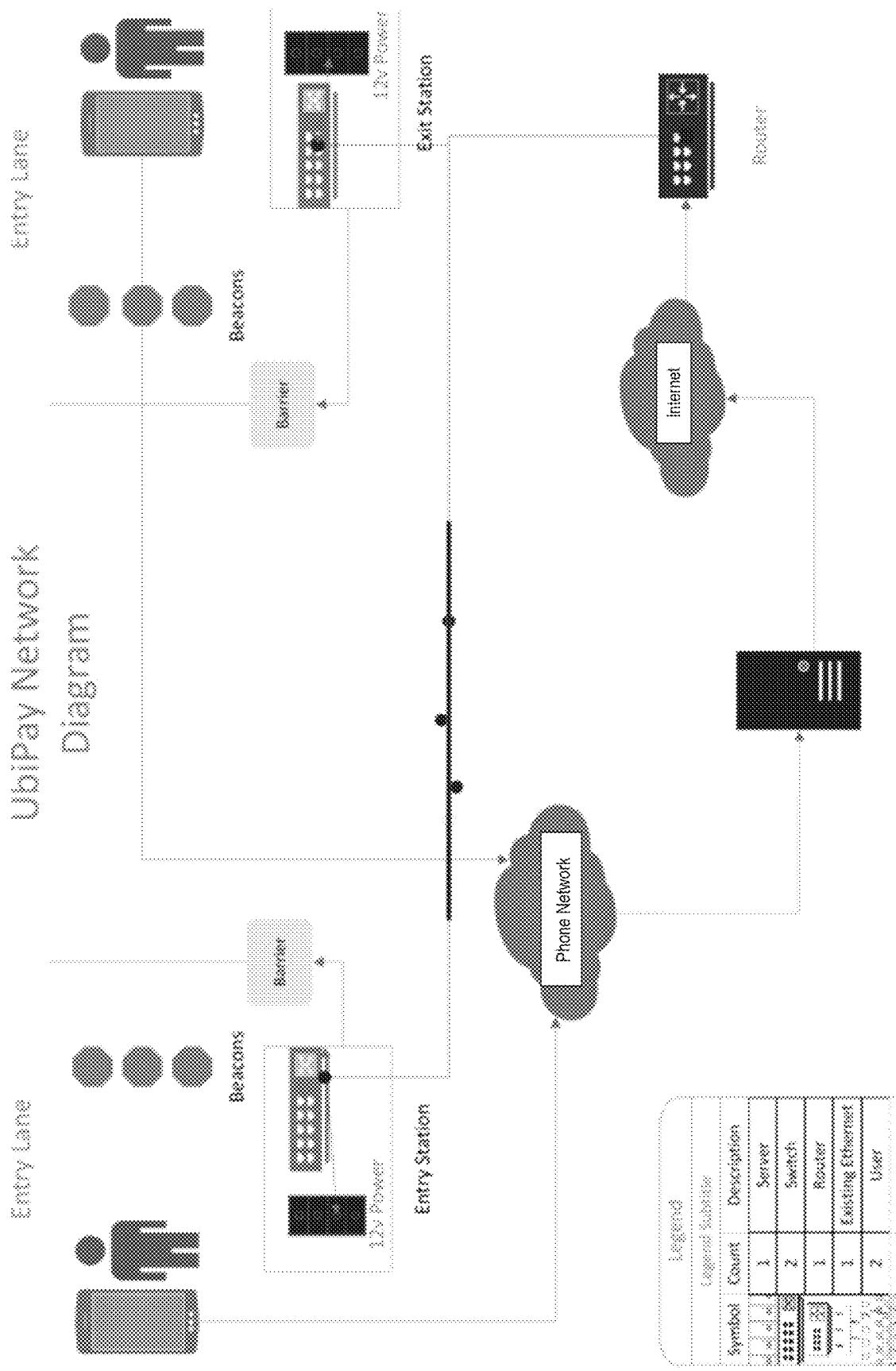
FIG. 14 shows a flow diagram of an exemplary user registration process.

Hardware requirements for a participating parking lot are shown in FIG. 14, and include the following: telecommunications network, beacons or GEO Fencing to locate the correct entry/exit lane for the user, Input/output board with USB and beacon, remotely managed router, ethernet network, network switch for splitting the ethernet network at each entry/exit parking station, 240v power required to drive input/output board, patch cables from switch to I/O board and from I/O board to barrier contacts, Internet connection.

In the following claims, the term "coordinating computer system" is used. It will be understood that the co-ordinating computer system may be owned, operated or administered by one entity or multiple entities. Any of the one or multiple entities may include an umbrella entity (for example a company with the main purpose of administering the present system, as distinct from being directly involved in providing parking spaces), one or a group of parking space providers, a payment gateway entity, a booking entity, a navigation entity, a parking space sales entity, and the like.

Any network of the present systems may be implemented by wired means, such as twisted pair wire, computer networking cabling (wired Ethernet as defined by IEEE 802.3), coaxial cable, ITU-T G.hn technology, optical fiber. The term "wired" and its derivatives may be used to describe circuits, devices, systems, methods, techniques, communications channels, etc., that may communicate data through the use of modulated electromagnetic radiation through a solid medium.

In addition or alternatively the network may be implemented by wireless means including terrestrial microwave, communications satellite, cellular and PCS systems, radio and spread spectrum technologies such the IEE 802.11 protocols. In the context of this document, the term "wireless" and its derivatives may be used to describe circuits, devices, systems, methods, techniques, communications channels, etc., that may communicate data through the use of modulated electromagnetic radiation through a non-solid medium.

The network may implement any suitable communications protocol including an Ethernet protocol, TCP/IP (including IPv4 and IPv6), Synchronous Optical Networking (SONET) and Synchronous Digital Hierarchy (SDH).

Then network may be implemented at any desired scale including personal area network, local area network, storage area network, campus area network, backbone network, metropolitan area network, wide area network, enterprise private network, virtual private network, virtual network, or internetwork.

The present invention may be considered to reside in a computer readable medium comprising substantially real-time updatable stock information drawn from the stock databases of multiple retail entities. The medium may be in the form of random access memory, magnetic hard drive, optical medium, or SSID for example. Preferably, the computer readable medium is comprises information readable by a relational database.

One embodiment of the systems and methods described herein is in the form of a computer-readable carrier medium carrying a set of instructions, e.g., a computer program for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method as described herein. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The information may be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers). The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

The methods and systems described herein may be deployed in part or in whole through one or more processors that execute computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a coprocessor (math co-processor, graphic co-processor, communication co-processor and the like) and the like that may directly or indirectly facilitate execution of program code or program instructions stored thereon. In addition, the processor may enable execution of multiple programs, threads, and codes.

The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code.

The processor may include memory that stores methods, codes, instructions and programs as described herein and elsewhere.

Any processor or a mobile communication device or server may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the processor may be a dual core processor, quad core processors, other chip-level multiprocessor and the like that combine two or more independent cores (called a die).

The methods and systems described herein may be deployed in part or in whole through one or more hardware components that execute software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, computers, and devices through a wired or a wireless medium, and the like. The methods, programs or codes as described herein and elsewhere may be executed by the server. In addition, other devices required for execution of methods as described in this application may be considered as a part of the infrastructure associated with the server.

The methods, program codes, calculations, algorithms, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, EVDO, mesh, or other networks types.

The methods, programs codes, calculations, algorithms and instructions described herein may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

The computer software, program codes, and/or instructions may be stored and/or accessed on computer readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks. Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on computers through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Furthermore, the elements depicted in any flow chart or block diagrams or any other logical component may be implemented on a machine capable of executing program instructions.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a computer readable medium.

The Application software may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention may be embodied in program instruction set executable on one or more computers. Such instructions sets may include any one or more of the following instruction types:

Data handling and memory operations, which may include an instruction to set a register to a fixed constant value, or copy data from a memory location to a register, or vice-versa, to store the contents of a register, result of a computation, or to retrieve stored data to perform a computation on it later, or to read and write data from hardware devices.

Arithmetic and logic operations, which may include an instruction to add, subtract, multiply, or divide the values of two registers, placing the result in a register, possibly setting one or more condition codes in a status register, to perform bitwise operations, e.g., taking the conjunction and disjunction of corresponding bits in a pair of registers, taking the negation of each bit in a register, or to compare two values in registers (for example, to see if one is less, or if they are equal).

Control flow operations, which may include an instruction to branch to another location in the program and execute instructions there, conditionally branch to another location if a certain condition holds, indirectly branch to another location, or call another block of code, while saving the location of the next instruction as a point to return to.

Coprocessor instructions, which may include an instruction to load/store data to and from a coprocessor, or exchanging with CPU registers, or perform coprocessor operations.

A processor of a computer of the present system may include "complex" instructions in their instruction set. A single "complex" instruction does something that may take many instructions on other computers. Such instructions are typified by instructions that take multiple steps, control multiple functional units, or otherwise appear on a larger scale than the bulk of simple instructions implemented by the given processor. Some examples of "complex" instructions include: saving many registers on the stack at once, moving large blocks of memory, complicated integer and floating-point arithmetic (sine, cosine, square root, etc.), SIMD instructions, a single instruction performing an operation on many values in parallel, performing an atomic test-and-set instruction or other read-modify-write atomic instruction, and instructions that perform ALU operations with an operand from memory rather than a register.

An instruction may be defined according to its parts. According to more traditional architectures, an instruction includes an opcode that specifies the operation to perform, such as add contents of memory to register—and zero or more operand specifiers, which may specify registers, memory locations, or literal data. The operand specifiers may have addressing modes determining their meaning or may be in fixed fields. In very long instruction word (VLIW) architectures, which include many microcode architectures, multiple simultaneous opcodes and operands are specified in a single instruction.

Some types of instruction sets do not have an opcode field (such as Transport Triggered Architectures (TTA) or the Forth virtual machine), only operand(s). Other unusual "0-operand" instruction sets lack any operand specifier fields, such as some stack machines including NOSC.

Conditional instructions often have a predicate field, being several bits that encode the specific condition to cause the operation to be performed rather than not performed. For example, a conditional branch instruction will be executed, and the branch taken, if the condition is true, so that execution proceeds to a different part of the program, and not executed, and the branch not taken, if the condition is false, so that execution continues sequentially. Some instruction sets also have conditional moves, so that the move will be executed, and the data stored in the target location, if the condition is true, and not executed, and the target location not modified, if the condition is false. Similarly, IBM z/Architecture has a conditional store. A few instruction sets include a predicate field in every instruction; this is called branch predication.

The instructions constituting a program are rarely specified using their internal, numeric form (machine code); they may be specified using an assembly language or, more typically, may be generated from programming languages by compilers.

It will be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The invention claimed is:

1. A computer-implemented parking system comprising:
   (i) a driver mobile electronic device configured to transmit a parking lot entry signal and a parking lot exit signal,
   (ii) a computer system of a first parking lot and a computer system of a second parking lot, each of the first and second parking lot computer systems being configured to receive the parking lot entry signal and the parking lot exit signal,
   (iii) computer-controllable vehicle entry and vehicle exit barrier stations in operable communication with each of the first and second parking lot computer systems,
      wherein each of the first and second parking lot computer systems is configured to:
         upon receipt of the parking lot entry signal transmit an open signal to the computer-controllable entry barrier station, and
         upon receipt of the parking lot exit signal transmit an open signal to the computer-controllable exit barrier station, and
   (iv) an umbrella entity computer system in network communication with the first and second parking lot computer systems, which coordinates parking arrangements of the first and second parking lots by reference to a received entry signal or exit signal.

2. The computer-implemented parking system of claim 1, wherein each of the computer-controllable entry and exit barrier stations comprise a receiver configured to receive the parking lot entry signal and parking lot exit signal respectively.

3. The computer-implemented parking system of claim 2, wherein the receiver is configured to detect, or to assist the first or second parking lot computer system to detect, the position of the driver mobile electronic device with reference to the computer-controllable entry or exit barrier station.

4. The computer-implemented parking system of claim 2, comprising two, three, four or more receivers, configured to receive the parking lot entry signal or the parking lot exit signal of an entry lane or an exit lane, the two, three, four or more receivers positioned or otherwise configured so as to together provide an indication of the location of the driver mobile electronic device with reference to the computer-controllable entry or exit barrier station.

5. The computer-implemented parking system of claim 4, wherein the strength of two or more parking lot entry signals, or two or more parking lot exit signals are analysed by algorithmic means to provide an indication of the location of the driver mobile electronic device with reference to the computer-controllable entry or exit barrier station.

6. The computer-implemented parking system of claim 5, wherein the algorithm is based on a geometric location method including but not limited to triangulation, trilateration, or triangulateration.

7. The computer-implemented parking system of claim 1, wherein the driver mobile electronic device comprises means for transmitting a barrier actuation instruction so as to cause the computer-controllable vehicle entry or vehicle exit barrier to move from a closed position to an open position.

8. The computer-implemented parking system of claim 7, wherein the driver mobile electronic device is comprises voice processing means and is configured to transmit the barrier actuation instruction upon receipt of a voice instruction from a user of the driver mobile electronic device.

9. The computer-implemented parking system of claim 7, wherein each of the computer-controllable vehicle entry and vehicle exit barriers each has associated vehicle detection means configured to detect the presence of absence of a vehicle in a lane for which the computer-controllable vehicle entry or vehicle exit barrier controls entry or exit.

10. The computer-implemented parking system of claim 9, wherein the vehicle detection means is an inductive loop system disposed in the lane for which the computer-controllable vehicle entry or vehicle exit barrier controls entry or exit.

11. The computer-implemented system of claim 9, configured such that:
   (i) upon receipt of a parking lot entry signal from a driver mobile electronic device, and actuation of the vehicle detection means, the driver mobile electronic device being detected in about the same position as the actuated vehicle detection means, the receipt of the parking lot entry signal and actuation of the vehicle detection means occurring contemporaneously or within a predetermined time period, the computer-controlled vehicle entry barrier is moved from a closed position to an open position, or
   (ii) upon receipt of a parking lot exit signal from a driver mobile electronic device, and actuation of the vehicle detection means, the driver mobile electronic device being detected in about the same position as the actuated vehicle detection means, the receipt of the parking lot exit signal and actuation of the vehicle detection means occurring contemporaneously or within a predetermined time period, the computer-controlled vehicle exit barrier is moved from a closed position to an open position.

12. The computer-implemented parking system of claim 1, wherein the umbrella entity computer system is further configured to calculate a parking fee based on the absolute time of receipt of the parking lot entry signal and the absolute time of receipt of the parking lot exit signal, or the time elapsed between receipt of the parking lot entry signal and receipt of the parking lot exit signal.

13. The computer-implemented parking system of claim 1, comprising a payer financial entity computer system in operable communication with the umbrella entity computer system, the payer financial entity computer system configured to electronically transmit funds from a parking fee payer account to a parking fee payee account of a payee financial entity computer system.

14. The computer-implemented parking system of claim 1, wherein the umbrella entity computer system information is in operable communication with one or more databases holding substantially up to date information on availability or non-availability of a plurality of parking spaces at one or more parking lots, and the coordinating computer system being configured to transmit the information on the presence or absence of one or more available parking spaces at one or more parking lots to the driver mobile electronic device or other driver electronic device.

15. The computer-implemented parking system of claim 14, wherein the driver mobile electronic device is location-enabled, and the umbrella entity computer system is configured via software algorithmic means identify the presence or absence of an available parking space at a parking lot which is geographically proximal to the location reported by the driver mobile device, the umbrella entity computer system being further configured to transmit information on the presence or absence of an available parking space at a parking lot which is geographically proximal to the location reported by the driver mobile electronic device.

16. The computer-implemented parking system of claim 15, wherein the umbrella entity computer system or the driver mobile electronic device is configured determine a route between the location of the driver mobile electronic device and an identified available parking space at a parking lot geographically proximal thereto, and via the driver mobile electronic device, to output visual or audio instructions to a user of the driver mobile electronic device so as to guide the user to an available parking space.

17. The computer-implemented parking system of claim 1, further comprising a parking space booking computer system having access to a database comprising substantially up to date information on availability or non-availability of a plurality of parking spaces at one or more parking lots, the parking space booking computer system configured to:
   (i) receive booking query information from a user electronic device, the booking query information comprising any one or more of: preferred parking location, preferred parking start time, preferred parking end time, preferred parking period, and maximum parking fee,
   (ii) search the database comprising information on the availability or non-availability of the plurality of parking spaces at one or more parking lots, the search having reference to the information at (i),
   (iii) transmit to a user electronic device information on one of more available parking spaces, and
   (iv) receive from a user electronic device a confirmation signal so as to book a parking space.

18. The system of claim 1, wherein the umbrella entity computer system is configured to process a parking payment and/or identify availability of parking in the first and second parking lots.

19. A method for entering and/or exiting a parking lot, the method being executed by use of a computer-implemented parking system comprising:
   (i) a driver mobile electronic device configured to transmit a parking lot entry signal and a parking lot exit signal,
   (ii) a computer system of a first parking lot and a computer system of a second parking lot, each of the first and second parking lot computer systems being configured to receive the parking lot entry signal and the parking lot exit signal,
   (iii) computer-controllable vehicle entry and vehicle exit barrier stations in operable communication with each of the first and second parking lot computer systems,
   wherein each of the first and second parking lot computer system is configured to:
   upon receipt of the parking lot entry signal transmit an open signal to the computer-controllable entry barrier station, and
   upon receipt of the parking lot exit signal transmit an open signal to the computer-controllable exit barrier station, and
   (iv) an umbrella entity computer system in network communication with the first and second parking lot computer systems, which coordinates the parking arrangements of the first and second parking lots by reference to a received entry signal or exit signal,
   the method comprising:
   a driver of a vehicle having disposed therein the driver mobile electronic device approaching a computer-controllable vehicle entry and/or vehicle exit barrier of a parking lot,
   causing or allowing a parking lot entry signal and/or exit signal to be transmitted from the driver mobile electronic device, and
   causing or allowing the first or second parking lot computer system to transmit an open signal to the computer-controllable entry barrier station and/or computer controllable exit station.

20. The method of claim 19 that is devoid of any of the following: an act of the driver contacting a vehicle window control, an act of the driver contacting the driver mobile electronic device, an act of the driver vocalising a voice command to the driver mobile electronic device, an act of the driver contacting the computer-controllable entry barrier station and/or computer controllable exit station, an act of the driver contacting a parking ticket, an act of the driver inserting a parking ticket into a pay station, an act of the driver contacting a debit card or a credit card, and any act on the part of the driver to pay a parking fee whilst in the process of entering or exiting a parking lot.

* * * * *